United States Patent [19]

Nishio

[11] Patent Number: 4,841,519
[45] Date of Patent: Jun. 20, 1989

[54] APPARATUS FOR DISCRIMINATING AN OPTICAL SIGNAL FROM OTHERS AND AN APPARATUS FOR TUNING AN OPTICAL WAVELENGTH FILTER USED IN THE SAME

[75] Inventor: Makoto Nishio, Tokyo, Japan
[73] Assignee: NEC Corporation, Tokyo, Japan
[21] Appl. No.: 212,384
[22] Filed: Jun. 27, 1988

[30] Foreign Application Priority Data

Jun. 26, 1987 [JP] Japan .................................. 62-160624
Jan. 6, 1988 [JP] Japan ..................................... 63-1474

[51] Int. Cl.[4] .............................................. H04B 9/00
[52] U.S. Cl. .......................................... 370/3; 370/1; 455/619; 455/617
[58] Field of Search ............... 370/1, 3; 455/606, 607, 455/608, 612, 617, 619; 329/144; 350/96.19

[56] References Cited

U.S. PATENT DOCUMENTS 3,986,020 10/1976 Kogelnik ................................. 370/3
4,571,024 2/1986 Husbands ......................... 350/96.19
4,792,999 12/1988 Stilwell, Jr. .......................... 455/619

OTHER PUBLICATIONS

International Zurich Seminar on Digital Communication, vol. B1.1, 1986, pp. 33–39; Wu et al., "Synchronous Wideband Network-An-Interoffice Facility".
Electronics Letters, vol. 23, No. 14, Jul. 2, 1987, pp. 750–752; Glance et al.; "Frequency Stabilization of FDM Optical Signals".

Primary Examiner—Robert L. Griffin
Assistant Examiner—Andrew J. Telesz, Jr.
Attorney, Agent, or Firm—Sughrue, Mion, Zinn, Macpeak & Seas

[57] ABSTRACT

An apparatus for discriminating an optical signal from others comprises a circuit for adding one of discriminating signals to a corresponding optical signal. The discriminating signal is of a frequency lower than a band of the optical signal. Therefore, the discriminating signal is easily detected by being passed through, for instance, a low-pass filter.

An apparatus for tuning an optical wavelength filter used in apparatus for discriminating an optical signal from others comprises a circuit for frequency-modulating an optical signal by a first discriminating signal and for amplitude-modulating the optical signal by a second discriminating signal having a phase information of the first discriminating signal. An optical wavelength filter is controlled to be tuned to a predetermined wavelength in accordance with a difference between a phase of the first discriminating signal and a phase of a first discriminating signal produced by the second discriminating signal, respectively, included in an output signal of the optical wavelength filter.

Alternatively, the apparatus for tuning an optical wavelength filter used in an apparatus for discriminating an optical signal from others comprises a circuit for modulating an optical signal by a discriminating signal of a predetermined period. The optical wavelength filter is controlled to be tuned to a predetermined wavelength in accordance with a difference between a phase of the discriminating signal and a phase of a discriminating signal included in an output signal of the optical wavelength filter.

6 Claims, 18 Drawing Sheets

INPUT DATA A

TIME

DISCRIMINATING SIGNAL f1

TIME

OUTPUT SIGNAL OF ADDER 61A

TIME

APPARATUS FOR DISCRIMINATING AN OPTICAL SIGNAL FROM OTHERS AND AN APPARATUS FOR TUNING AN OPTICAL WAVELENGTH FILTER USED IN THE SAME

FIELD OF THE INVENTION

The invention relates to an apparatus for discriminating an optical signal from others and an apparatus for tuning an optical wavelength filter used in the same, and more particularly to an apparatus for discriminating an optical signal from others which is applicable to a transmission line change-over means, an optical switching means etc. in an optical wavelength division multiplexing transmitting system and to an apparatus for tuning an optical wavelength filter used in the same which is also applicable to the same use.

BACKGROUND OF THE INVENTION

These days, there is increased the need of communication service in which broad band signals such as image data are transmitted with a predetermined quality. A band of the signals ranges from several MHz to several tens MHz so that there is widely adopted an optical transmitting system in which an electric-optic converter is used in a transmitter, an optical fiber having advantages such as small diameter, broad band, low loss, anti-electromagnetic induction etc. as compared to a coaxial cable is provided for propagating optical signal, and an optic-electric converter is used in a receiver. In such a system, a plurality of electric signals having different frequencies are converted in a plurality of electric-optic converters of a transmitter into a plurality of optical signals having different wavelengths which are propagated through an optical fiber, and the plurality of optical signals thus propagated are divided in a divider of a receiver by respective wavelengths and then converted in a plurality of optic-electric converters thereof into the plurality of electric signals whereby the plurality of electric signals can be transmitted in an optical wavelength division multiplexing transmitting system.

In such an optical wavelength division multiplexing transmitting system, there is used a transmission line change-over means in which an predetermined wavelength of optical signal is selected from wavelength division multiplexing signals propagated through an optical fiber connecting between a transmitter and a receiver. In the transmission line change-over means, a wavelength of a selected optical signal must be discriminated from others so that a correct wavelength of an optical signal is selected whereby an optical signal of a wavelength other than the predetermined wavelength is avoided to be selected into a selected one of divided transmission lines.

Even in an optical wavelength division switching device, there is used a wavelength tunable filter through which a predetermined wavelength of an optical signal is passed to be selected among wavelength division multiplexing signals. For the purpose, a wavelength of the optical signal thus passed through the filter must be discriminated from others.

Such an apparatus for discriminating an optical signal from others is described on pages 33 to 39 of "International Zurich Seminar on Digital Communication, Vol. B1.1, 1986".

In the apparatus for discriminating an optical signal from others, input data A and a discriminating signal A are multiplexed to produce a multiplexed signal A by a time-division multiplexer, and input data B and a discriminating signal B are multiplexed to produce a multiplexed signal B by another time-division multiplexer. The multiplexed signals A and B are converted in corresponding electric-optic converters to optical signals A and B having wavelengths $\lambda_1$ and $\lambda_2$ respectively. The optical signals A and B are multiplexed to be propagated through an optical fiber by a wavelength multiplexer. The optical multiplexed signal thus propagated through the optical fiber is divided into two optical multiplexed signals by a divider. Each of the two optical multiplexed signals are supplied to a corresponding one of transmission line change-over means. In one of the transmission line change-over means, an optical signal of a predetermined wavelength $\lambda_1$ or $\lambda_2$ is selected to be supplied to a corresponding transmission line. For this purpose, an optical signal which is selected in a wavelength tunable filter is divided into two optical signals by a divider. One of two optical signals thus divided is converted in an optic-electric converter to an electric time-division signal including input data and a discriminating signal which is then supplied to a separating circuit and a frame synchronous circuit. In the separating circuit, the input data and the discriminating signal are separated from each other in accordance with a frame synchronous signal supplied from the frame synchronous circuit so that the discriminating signal is only supplied therefrom. The discriminating signal thus separated is discriminated in a filter control circuit to be determined whether or not it is the discriminating signal A in a case where the aforementioned predetermined wavelength is $\lambda_1$. When the discriminating signal 1 is not the discriminating signal A, it is decided in the filter control circuit that an optical signal of a wavelength other than a wavelength $\lambda_1$ is selected. Thereafter, the wavelength tunable filter is swept from a short wavelength to a long wavelength and vice versa by the filter control circuit. The sweep of the wavelength tunable filter is stopped to be continued when an output of the separating circuit coincides with the discriminating signal A.

Thus, optical signals of predetermined different wavelengths are selected in transmission line change-over means to be supplied to respective transmission lines.

In the apparatus for discriminating an optical signal from others, however, there is a disadvantage that a circuit construction is complicated and a consuming electric power is increased for the reason why an optic-electric converter, a separating circuit and a frame synchronous circuit provided in a transmission line change-over means must be responded in a high speed to input data in a case where a speed of the input data is increased because the input data and a discriminating signal is multiplexed in a time-division.

In the apparatus for discriminating an optical signal from others, there is used a wavelength tunable filter in which an optical signal of a predetermined wavelength is selected from a wavelength division multiplexing signal to be supplied to a transmission line as described before. Such a wavelength tunable filter is described as a distributed feedback laser device (DFB LD) in "Proceedings, No. 326 of The institute of Electronics Information and Communication Engineers". The DFB LD is a current control type of a wavelength filter in which an injecting current less than an oscillation threshold value is varied in its level so that a center wavelength thereof is changeable. However, a wavelength filter utilizing the DFB LD has a temperature-dependent property in which a center wavelength is fluctuated by approximately 1A°/C° because the DFB LD is fabricated from InP system material. For this reason, the wavelength filter must be controlled to be tuned to an optical signal of a correct wavelength even if a temperature is fluctuated. Such a wavelength filter is used even in an optical wavelength division switching means in which a plurality of optical signals each having a predetermined different wavelength from others are switched.

A conventional apparatus for tuning an optical wavelength filter is described on pages 750 to 752 of "Electronics Letters, July 2, 1987 Vol. 23, No. 14".

In the apparatus for tuning an optical wavelength filter, a center wavelength of a wavelength filter is controlled in advance to be near a predetermined wavelength of an optical signal which will be selected correctly. Thereafter, an optical signal passed through the wavelength filter is converted into an electric signal which is then multiplied in a multiplier with a discriminating signal supplied from an optical wavelength multiplexing circuit. A multiplied output is supplied from the multiplier to a low-pass filter so that a direct current component thereof is passed therethrough to be supplied to a filter driving circuit. Current injected into the wavelength filter is controlled in accordance with the direct current component by the filter driving circuit so that a center wavelength of the wavelength filter is tuned to a predetermined wavelength of an optical signal to be selected correctly, although detailed explanations of operation described above will be made later.

According to the apparatus for tuning an optical wavelength filter, however, there is a disadvantage that a discriminating signal must be supplied from an optical wavelength multiplexing circuit to a multiplier by use of a transmission line. There is a further disadvantage that a center wavelength of a wavelength filter is controlled in advance to be near a predetermined wavelength of an optical signal which will be selected correctly in a case where the center wavelength thereof is different to some extent from a tuning wavelength because an output of a low-pass filter is only used for a control signal by which the center frequency thereof is tuned to a predetermined wavelength of an optical signal to be selected correctly.

Accordingly, it is an object of the invention to provide an apparatus for discriminating an optical signal from others in which a circuit construction can be avoided to be complicated and electric power is less consumed even if a speed of input data is much increased.

It is a further object of the invention to provide an apparatus for tuning an optical wavelength filter used in an apparatus for discriminating an optical signal from others in which a discriminating signal is not necessary to be transmitted from an optical wavelength multiplexing circuit to a multiplier thereby being multiplied with an electric signal converted from an optical signal passed through a wavelength filter.

It is a still further object of the invention to provide an apparatus for tuning an optical wavelength filter used in an apparatus for discriminating an optical signal from others in which a center wavelength of a wavelength filter is not necessary controlled in advance to be near a tuning wavelength thereof.

According to one feature of the invention, an apparatus for discriminating an optical signal from others comprises, a plurality of adding means, each including an adder in which input data and a discriminating signal of a frequency lower than a signal band of said input data are added to produce an added signal, a plurality of electric-optic converters, each converting said added signal into an optical signal of a predetermined wavelength different from others, a wavelength multiplexer for multiplexing optical signals supplied from said plurality of electric-optic converters to produce an optical wavelength division multiplexing signal which is propagated through a wavelength multiplexing transmission line, a divider for dividing said optical wavelength division multiplexing signal into a plurality of optical wavelength division multiplexing signals, and a plurality of transmission line change-over means, each supplying an optical signal of a predetermined wavelength to a corresponding transmission line and including a wavelength filter for passing an optical signal of a wavelength selected from plural wavelengths therethrough, a circuit for detecting a discriminating signal included in said optical signal passed through said wavelength filter, and a circuit for controlling said wavelength filter in accordance with said discriminating signal detected in said circuit for detecting whereby a center wavelength of said wavelength filter is tuned to a predetermined tuning wavelength.

According to a further feature of the invention, an apparatus for tuning an optical wavelength filter used in an apparatus for discriminating an optical signal from others comprises, a circuit for producing an optical wavelength division multiplexing signal which includes a plurality of optical signals each having a different wavelength from others, each of said optical signals being frequency-modulated by a first discriminating signal and being amplitude-modulated by a second discriminating signal having a phase information of said first discriminating signal, an optical wavelength tunable filter for passing an optical signal of a predetermined wavelength therethrough, means for converting said optical signal passed through said optical wavelength tunable filter into an electric signal, first and second filters for passing first and second signals of the same frequencies as said first and second discriminating signals, a circuit for producing a third signal of the same frequency as said first discriminating signal in accordance with said second signal, a circuit for producing a direct current component in accordance with a multiplication of said first and third signals, and a circuit for controlling said wavelength tunable filter to be tuned to an optical signal of a predetermined wavelength by sweeping a center wavelength thereof in accordance with said direct current component.

According to a still further feature of the invention, an apparatus for tuning an optical wave length filter used in an apparatus for discriminating an optical signal from others comprises, a circuit for producing an optical wavelength division multiplexing signal which includes a plurality of optical signals each having a different wavelength from others, each of said optical signals being frequency-modulated by a discriminating signal, an optical wavelength tunable filter for passing an optical signal of a predetermined wavelength therethrough, means for converting said optical signal passed through said optical wavelength tunable filter into an electric signal, a circuit for producing a direct current component in accordance with a multiplication of said electric signal and said discriminating signal, a circuit for producing a control signal in accordance with a frequency difference between said electric signal and said discriminating signal, and a circuit for controlling said wavelength tunable filter to be tuned to an optical signal of a predetermined wavelength by sweeping a center wavelength thereof in accordance with said direct component and said control signal.

BRIEF DESCRIPTION OF THE DRAWINGS

The invention will be described in more detail in conjunction with appended drawings wherein.

DESCRIPTION OF PREFERRED EMBODIMENT

Figure 1:
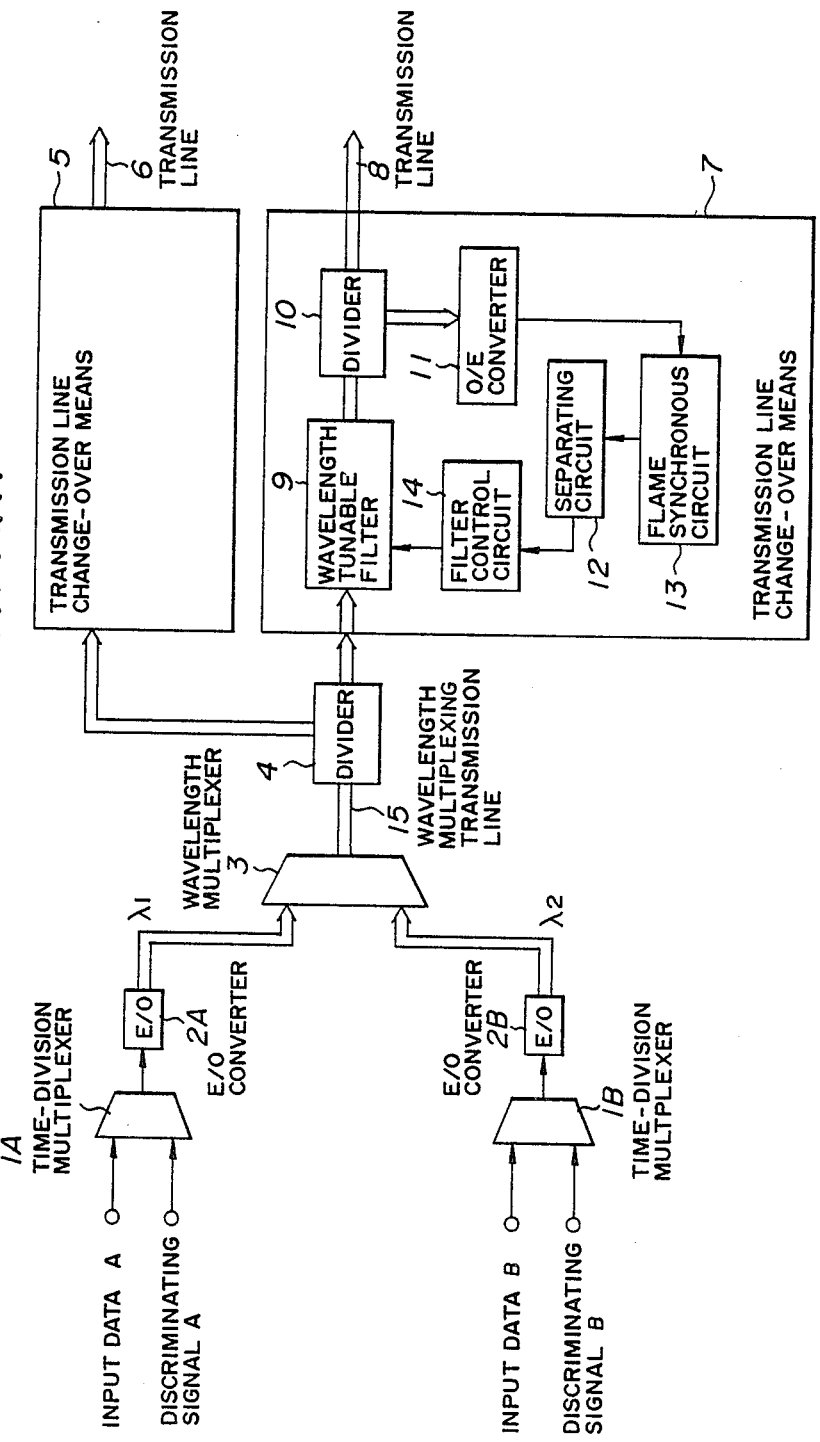
FIG. 1 is a block diagram showing a conventional apparatus for discriminating an optical signal from others.

Before explaining an apparatus for discriminating an optical signal from others according to the invention, a conventional apparatus for discriminating an optical signal from others as briefly described before will be explained again. FIG. 1 shows the conventional apparatus for discriminating an optical signal from others which mainly comprises an optical wavelength multiplexing circuit and a predetermined number of transmission line change-over means. The optical wavelength multiplexing circuit includes time-division multiplexers 1A and 1B, electric-optic converters 2A and 2B, and a wavelength multiplexer 3. In the time-division multiplexers 1A and 1B, input data A and discriminating signal A, and input data B and discriminating signal B are multiplexed to produce time-division multiplexing signals respectively. The multiplexing signals are converted, in the electric-optic converters 2A and 2B, respectively, into optical signals having wavelengths $\lambda_1$ and $\lambda_2$ which are then multiplexed in the wavelength multiplexer 3 to be supplied to a divider 4 as a wavelength division multiplexing signal. The wavelength division multiplexing signal is divided in the divider 4 into two wavelength division signals. Two transmission line change-over means 5 and 7 are shown in FIG. 1 as the aforementioned predetermined number of transmission line change-over means. The transmission line change-over means 7 includes a wavelength tunable filter 9, a divider 10, an optic-electric converter 11, a separating circuit 12, a frame synchronous circuit 13, and a filter control circuit 14. The transmission line change-over means 5 also includes a wavelength tunable filter 9 to a filter control circuit 14 as included in the transmission line change-over means 7. The two wavelength division multiplexing signals thus divided in the divider 4 are supplied to the transmission line change-over means 5 and 7 which are connected to transmission lines 6 and 8 respectively. Here, it is assumed that an optical signal of a wavelength $\lambda_1$ is switched to the transmission line 8. In the transmission line change-over means 7, an optical signal not to be discriminated correctly is selected in the wavelength tunable filter 9. A major portion of the selected optical signal is supplied to the transmission line 8, while the remaining portion thereof is supplied to the optic-electric converter 11 to be converted into an electric signal having input data and a discriminating signal in a time-division. The electric time-division signal is supplied to the separating circuit 12 and the frame synchronous circuit 13, and separated in the separating circuit 12 into input data and a discriminating signal in accordance with a frame synchronous signal supplied thereto from the frame synchronous circuit 13 so that the discriminating signal is only supplied from the separating circuit 12 to the filter control circuit 14 in which it is detected whether or not the discriminating signal is the discriminating signal A. In a case where it is not the discriminating signal A, it is judged that an optical signal of a wavelength other than a wavelength $\lambda_1$ for an optical signal to be selected correctly is selected in the wavelength tunable filter 9. Consequently, a sweep of wavelengths is performed in the wavelength tunable filter 9 from a short wavelength to a long wavelength and vice versa by the filter control circuit 14. Thus, an optical signal of a wavelength $\lambda_1$ is correctly selected in the wavelength tunable filter 9 to be supplied through the divider 10 to the transmission line 8. The transmission line changeover means 5 operates in the same manner as described above so that an optical signal of a wavelength $\lambda_2$ is supplied therefrom to the transmission line 6.

Figure 2:
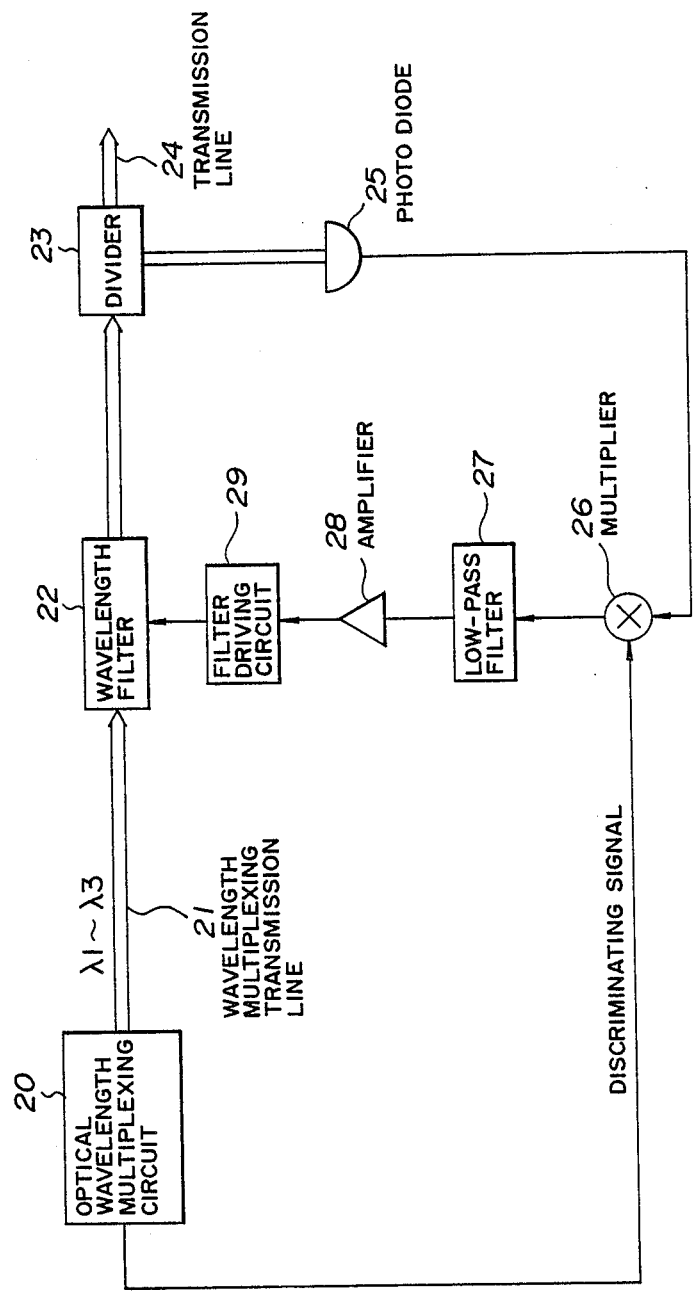
FIG. 2 is a block diagram showing a conventional apparatus for tuning an optical wavelength filter used in an apparatus for discriminating an optical signal from others.

Further, a conventional apparatus for tuning an optical wavelength filter which is used, for instance, in an apparatus for discriminating an optical signal from others described in FIG. 1 will be explained again. FIG. 2 shows the apparatus for tuning an optical wavelength filter which comprises an optical wavelength multiplexing circuit 20 for producing a wavelength division multiplexing signal having wavelengths $\lambda_1$, $\lambda_2$ and $\lambda_3$, a wavelength filter 22 which is tuned to one of the wavelengths $\lambda_1$, $\lambda_2$ and $\lambda_3$ of the wavelength division multiplexing signal propagated through a wavelength multiplexing transmission line 21, a divider 23 for dividing an optical signal supplied from the wavelength filter 22 into two optical signals, a transmission line 24 for propagating one of the two optical signals divided in the divider 23, a photodiode 25 for converting the remaining one of the two optical signal divided in the divider 24 into an electric signal, a multiplier 26 for multiplying the converted electric signal by a discriminating signal supplied from the optical wavelength multiplexing circuit 20, a low-pass filter 27 for passing a direct current component of an output of the multiplier 26, an amplifier 28 for amplifying an output of the low-pass filter 27, and a filter driving circuit 29 for controlling the wavelength filter 22 in accordance with a output of the amplifier 28.

Figure 3:
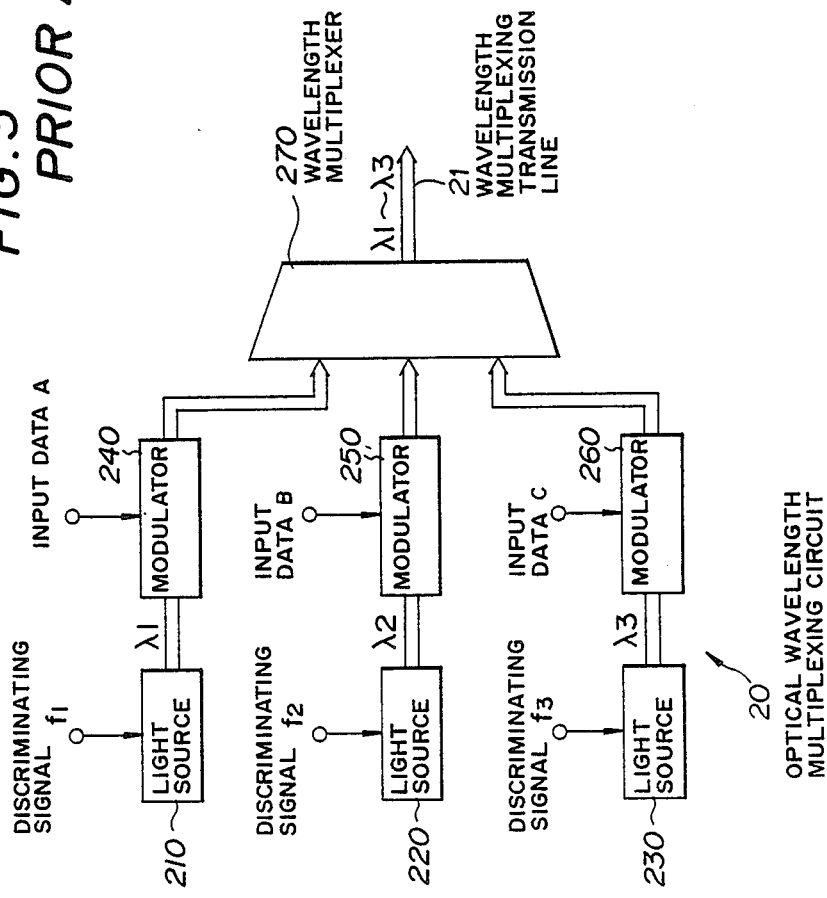
FIG. 3 is a block diagram showing an optical wavelength multiplexing circuit included in the conventional apparatus for tuning an optical wavelength filter.

FIG. 3 shows the optical wavelength multiplexing circuit 20 which includes light sources 210, 220 and 230 into which discriminating signals $f_1$, $f_2$ and $f_3$ of low frequencies are injected so that refractive indexes thereof are changed dependent on the discriminating signals $f_1$, $f_2$ and $f_3$ to modulate frequencies of lights radiated therefrom in accordance with the discriminating signals $f_1$, $f_2$ and $f_3$, modulators 240, 250 and 260 for amplitude-modulating frequency-modulated lights of wavelengths $\lambda_1$, $\lambda_2$ and $\lambda_3$ radiated from the light sources 210, 220 and 230 in accordance with input data A, B and C, and a wavelength multiplexer 270 for multiplexing optical signals supplied from the modulators 240, 250 and 260.

In operation, it is assumed that the wavelength filter 22 is tuned to an optical signal of a wavelength $\lambda_2$ in an optical wavelength division multiplexing signal having wavelengths $\lambda_1$, $\lambda_2$ and $\lambda_3$. At first, a center frequency of the wavelength filter 22 is controlled to be near a tuning wavelength $\lambda_2$ of an optical signal to be selected therein correctly before an optical signal of a wavelength $\lambda_2$ is supplied therefrom. Output light of the wavelength $\lambda_2$ supplied from the wavelength filter 22 is supplied through the divider 23 in a major portion thereof to a transmission line 24, and in the remaining portion thereof to the photodiode 25. The output light of the wavelength $\lambda_2$ is converted in the photodiode 25 into an electric signal which is then supplied to the multiplier 26. The electric signal is multiplied in the multiplier 26 by a discriminating signal of a frequency $f_2$ which is supplied from the optical wavelength multiplexing circuit 20. Output signal of the multiplier 26 is supplied to the low-pass filter 27 through which a direct current component and a component in the vicinity of the direct current component are only passed. Output signal of the low-pass filter 27 is amplified in the amplifier 28 and then supplied to the filter driving circuit 29 by which current injected into the wavelength filter 22 is controlled to be increased or decreased in accordance with a signal thus amplified in the amplifier 28 so that a center wavelength of the wavelength filter 22 is tuned to the wavelength $\lambda_2$ for an optical signal to be selected therein correctly.

Figure 4A:
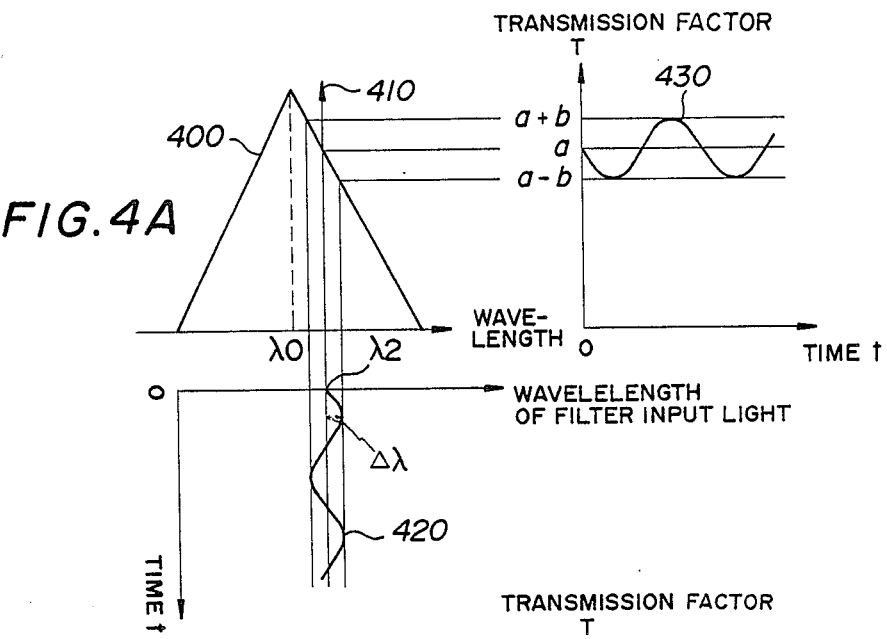
FIGS. 4A and 4B are explanatory diagrams showing relations between a transmission factor and a wavelength, and between a transmission factor and time in operation of the apparatus shown in FIG. 3, FIGS. 5A to 5E are wave forms of signals in the apparatus shown in FIG. 3.

In the operation described above, a center wavelength $\lambda_0$ of a transmission property 400 of the wavelength filter 22 is assumed to be positioned on a short wavelength side of light 410 having the wavelength $\lambda_2$ as shown in FIG. 4A. Light of the wavelength $\lambda_2$ radiated from the light source 220 which is frequency-modulated in accordance with the discriminating signal B of a low-frequency sinusoidal wave $f_2$ is changed in a period of a frequency $f_2$ by a wavelength width $\pm\Delta\lambda$ as shown by a reference numeral 420 in FIG. 4A. Therefore, a transmission factor T of the wavelength filter 22 is also changed in a sinusoidal shape as shown by a reference numerals 430 in FIG. 4A. In other words, the transmission factor T of the wavelength filter 22 having the transmission property 400 is changed in the period of the frequency $f_2$ by an amplitude b on an average transmission factor a in regard to the light of the wavelength $\lambda_2$ which is frequency-modulated by the frequency $f_2$.

Figure 4B:
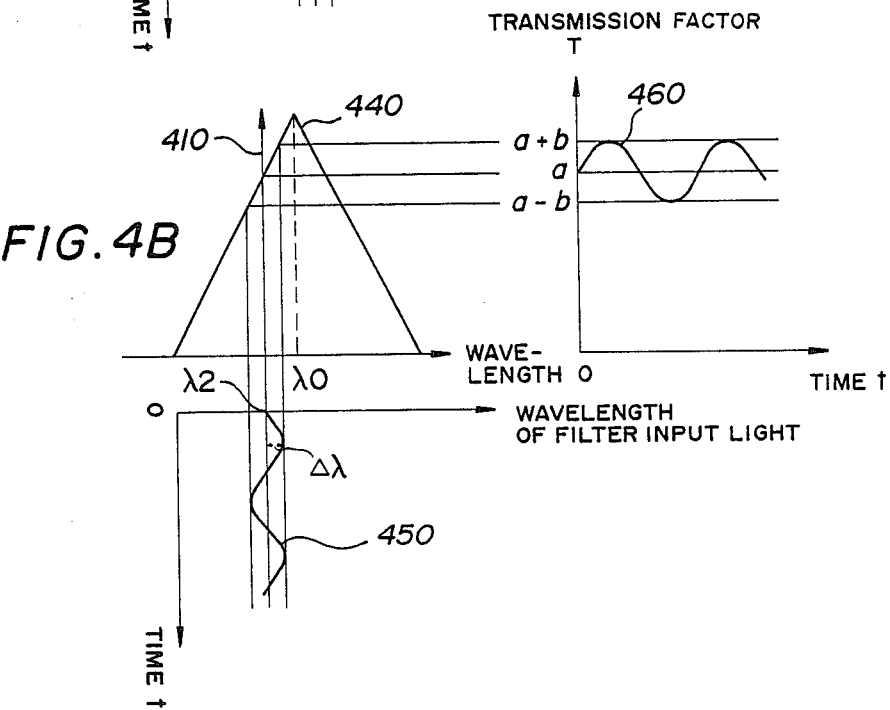

On the other hand, a center wavelength $\lambda_0$ of a transmission property 440 of the wavelength filter 22 is assumed to be positioned on a long wavelength side of the light 410 having the wavelength $\lambda_2$ as shown in FIG. 4B. The light of the wavelength $\lambda_2$ radiated from the light source 220 which is frequency-modulated by a sinusoidal wave of the low-frequency $f_2$ is changed as shown by a reference numeral 450 in FIG. 4B. Accordingly, a transmission factor T of the wavelength filter 22 is changed in a sinusoidal shape as shown by a reference numeral 460. Thus, the transmission factor T of the wavelength filter 22 having the transmission property 440 is changed in the same pattern as in FIG. 4A in regard to the light of the wavelength $\lambda_2$ which is frequency-modulated by the frequency $f_2$, provided that the sinusoidal wave 460 is out of phase in regard to the sinusoidal wave 430.

Figure 5A:
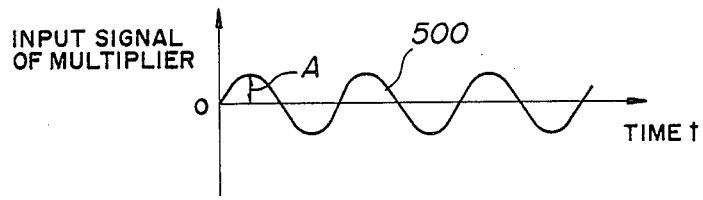
Figure 5B:
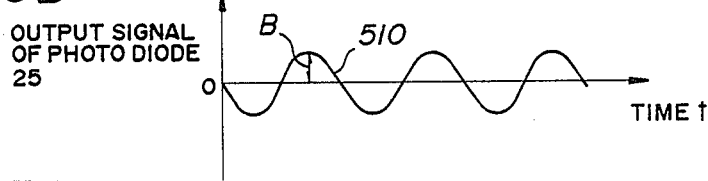

In FIG. 5A, there is shown the discriminating signal 500 of the frequency $f_2$ which is supplied from the wavelength multiplexing circuit 20 to the multiplier 26 and defined to be "$A \cos(2\pi f_2 + \phi_2)$", where A is an amplitude and $\phi_2$ is a phase. In FIG. 5B, there is shown an electric signal 510 corresponding to the sinusoidal wave 430 in FIG. 4A which is supplied from the photodiode 27 and defined to be "$-B \cos(2\pi f_2 + \phi_2)$", where B is an amplitude and $\phi_2$ is a phase. In the multiplier 26, the both signals 500 and 510 are multiplied to produce a multiplied signal which is defined in the equation (1).

$$A \cos(2\pi f_2 + \phi_2) \times [-B \cos(2\pi f_2 + \phi_2)] = \quad (1)$$

$$-\tfrac{1}{2}AB - \tfrac{1}{2}AB \cos(4\pi f_2 + 2\phi_2)$$

Figure 5C:
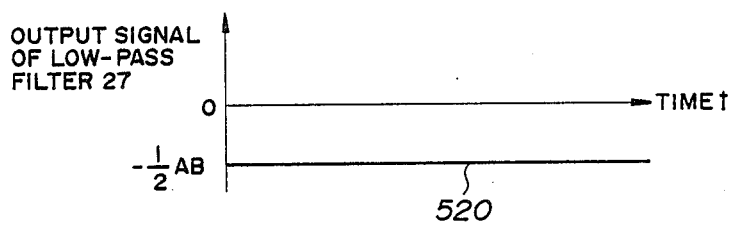

Accordingly, a higher harmonic component "$4f_2$" of the second term in the equation (1) is removed in the low-pass filter 28 so that a negative direct current component 520 of a value "$-\frac{1}{2}AB$" is detected to be supplied therefrom to the amplifier 28 as shown in FIG. 5C.

Figure 5D:
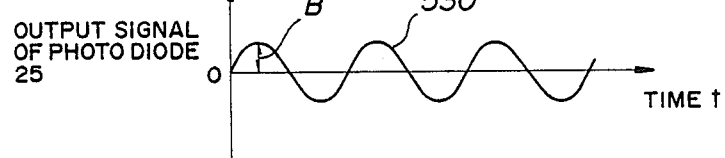

On the other hand, there is shown in FIG. 5D an electric signal 530 corresponding to the sinusoidal wave 460 which is supplied from the photodiode 27 and defined to be "$B \cos(2\pi f_2 + \phi_2)$". In the multiplier 26, the aforementioned discriminating signal 500 and the electric signal 530 are multiplied to produce a multiplied signal which is defined in the equation (2).

$$A \cos(2\pi f_2 + \phi_2) \times B \cos(2\pi f_2 + \phi_2) = \quad (2)$$

$$\frac{1}{2}AB + \frac{1}{2}AB \cos(4\pi f_2 + 2\phi_2)$$

Figure 5E:
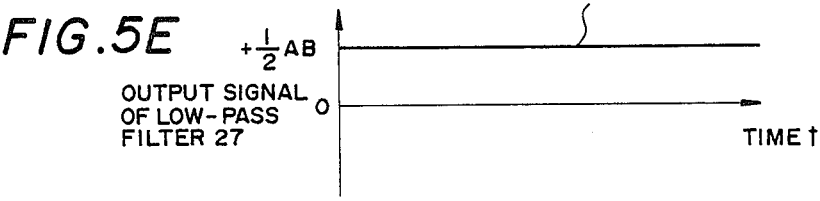

Accordingly, a higher harmonic component "$4f_2$" of the second term in the equation (2) is removed in the low-pass filter 28 so that a positive direct current component 540 of a value "$\frac{1}{2}AB$" is detected to be supplied therefrom to the amplifier 28 as shown in FIG. 5E.

In a case where the negative direct current component "$-\frac{1}{2}AB$" is supplied through the amplifier 28 the filter driving circuit 29, current injected into the wavelength filter 22 is thereby controlled to shift a center wavelength $\lambda_0$ thereof in a direction of a long wavelength. On the other hand, in a case where the positive current component "$\frac{1}{2}AB$" is supplied through the amplifier 28 to the filter driving circuit 29, current injected into the wavelength filter 22 is thereby controlled to shift a center wavelength $\lambda_0$ thereof in a direction of a short wavelength.

Next, preferred embodiments of the invention will be explained in FIG. 6 through FIG. 18.

Figure 6:
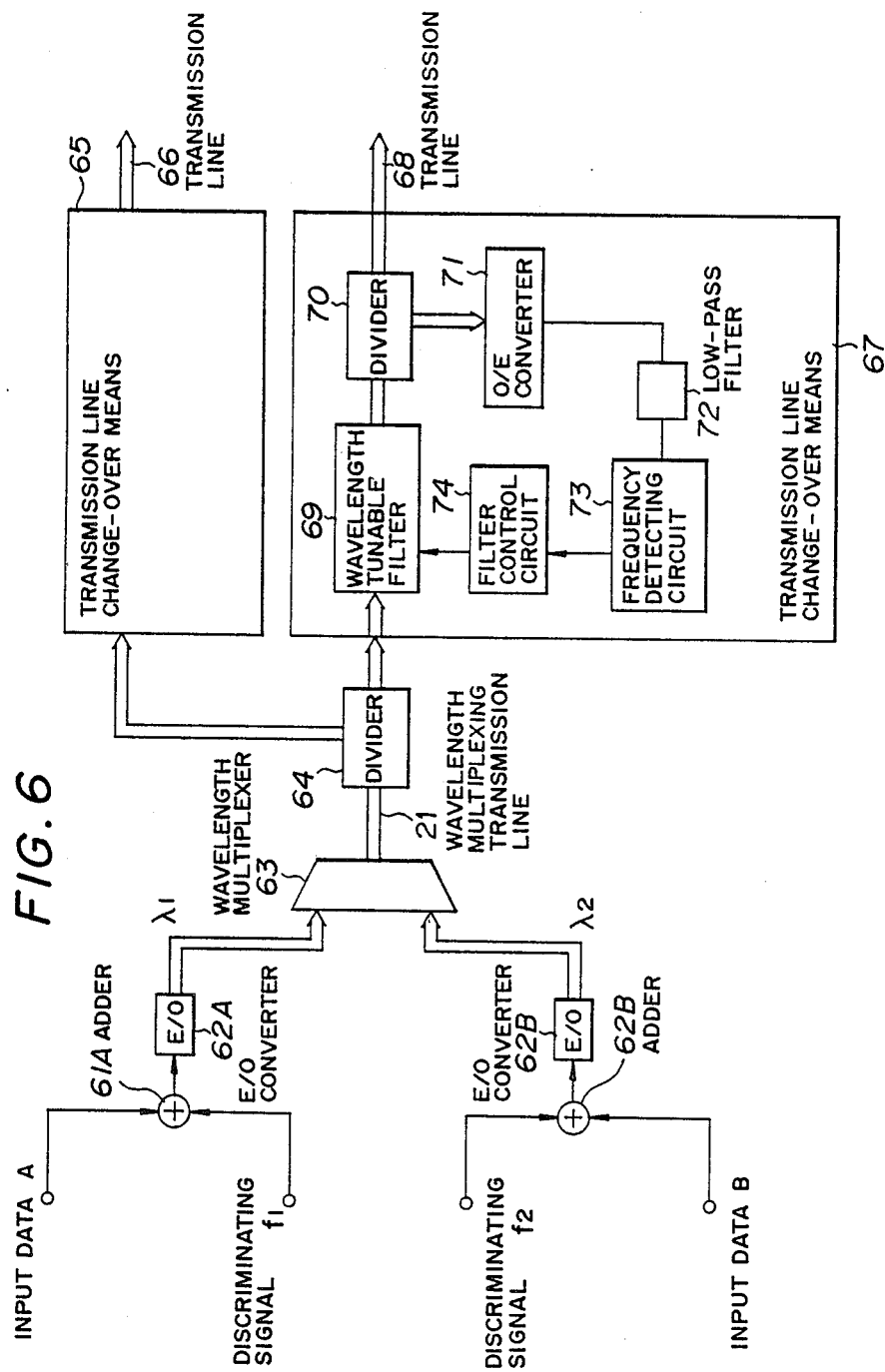
FIG. 6 is a block diagram showing a first embodiment of an apparatus for discriminating an optical signal from others according to the invention.

In FIG. 6, there is shown an apparatus for discriminating an optical signal from others in a first embodiment according to the invention. In the apparatus for discriminating an optical signal from others, input data A and a discriminating signal $f_1$ of a low frequency which is much lower than a band of the input data A are added in an adder 61A. Further, input data B and a discriminating signal $f_2(f_1 \neq f_2)$ of a similarly low frequency are added in an adder 61B. Outputs of the adders 61A and 61B are converted in electric-optic converters 62A and 62B into optical signals of wavelengths $\lambda_1$ and $\lambda_2$, respectively, which are then multiplexed in a wavelength multiplexer 63 to be supplied to a wavelength multiplexing transmission line 21. The wavelength division multiplexing signal is divided in a divider 64 into two optical signals which are supplied to transmission line change-over means 65 and 67.

In the transmission line change-over means 67, a wavelength tunable filter 69 sweeps a tuning wavelength from a short to long wavelength sides and vice versa to select an optical signal of a predetermined wavelength. Here, it is assumed that an optical signal of a wavelength $\lambda_1$ is selected in the wavelength tunable filter 69 at a specific time. The selected optical signal of the wavelength $\lambda_1$ is divided in a divider 70 to be supplied in a major portion thereof to a transmission line 68 and in the remaining portion thereof to an optic-electric converter 71. The optical signal supplied to the optic-electric converter 71 is converted into an electric signal which is then supplied to a low-pass filter 72 so that the discriminating signal $f_1$ of the low-frequency is only passed through the low-pass filter 72. The discriminating signal $f_1$ is detected in a frequency detecting circuit 73 so that a detected signal is supplied to a filter control circuit 74. As a result, it is discriminated in the filter control circuit 74 that a wavelength of an optical signal which is now selected in the wavelength tunable filter 69 is $\lambda_1$. Consequently, a sweep of the wavelength tunable filter 69 is stopped to be continued by the filter control circuit 74 so that the optical signal of the wavelength $\lambda_1$ is supplied to the transmission line 68.

As clearly understood from the above, an optical signal of a wavelength $\lambda_2$ is supplied through the transmission line change-over means 67 to the transmission line 68 in a case where a sweep of the wavelength tunable filter 69 is stopped to be continued when a frequency of a discriminating signal which is detected in the frequency detecting circuit 73 coincides with a frequency of the discriminating signal $f_2$ for the optical signal of the wavelength $\lambda_2$. The frequency detecting circuit 73 can be composed of, for instance, a frequency counter which is easy to be fabricated in an integrated circuit.

Figure 7A:
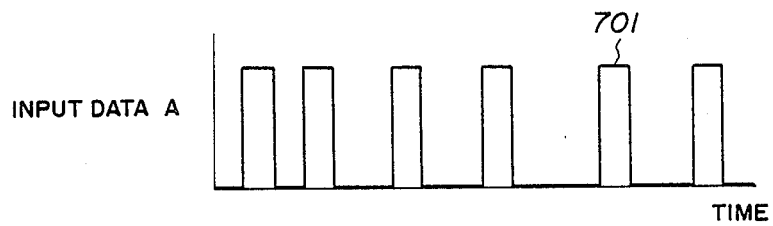
FIGS. 7A to 7C are wave forms of signals in the first embodiment of the apparatus shown in FIG. 6.
Figure 7B:
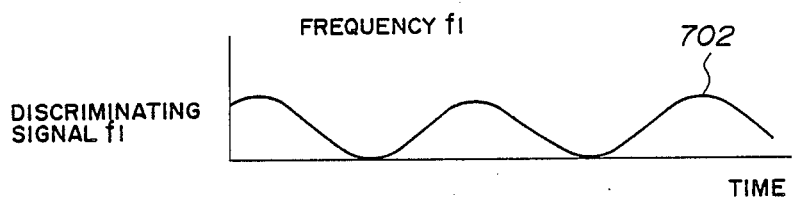
Figure 7C:
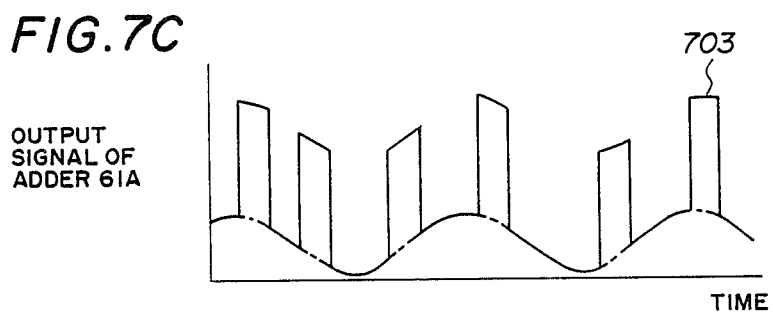

In FIGS. 7A to 7C, a reference numeral 701 indicates the input data A, 702 the discriminating signal $f_2$, and 703 the output of the adder 61A in the apparatus in the first embodiment described above. The electric-optic converter 62A converts the output 703 of the adder 61A into the optical signal of the wavelength $\lambda_1$ so that a wave form of a signal supplied to the optic-electric converter 71 is the same as that of the output 703 in a case where the optical signal of the wavelength $\lambda_1$ is selected in the wavelength tunable filter 69. Therefore, the discriminating signal $f_2$ of the wave form 702 is obtained from the low-pass filter 72 to which the signal of the wave form 703 is supplied.

Figure 8:
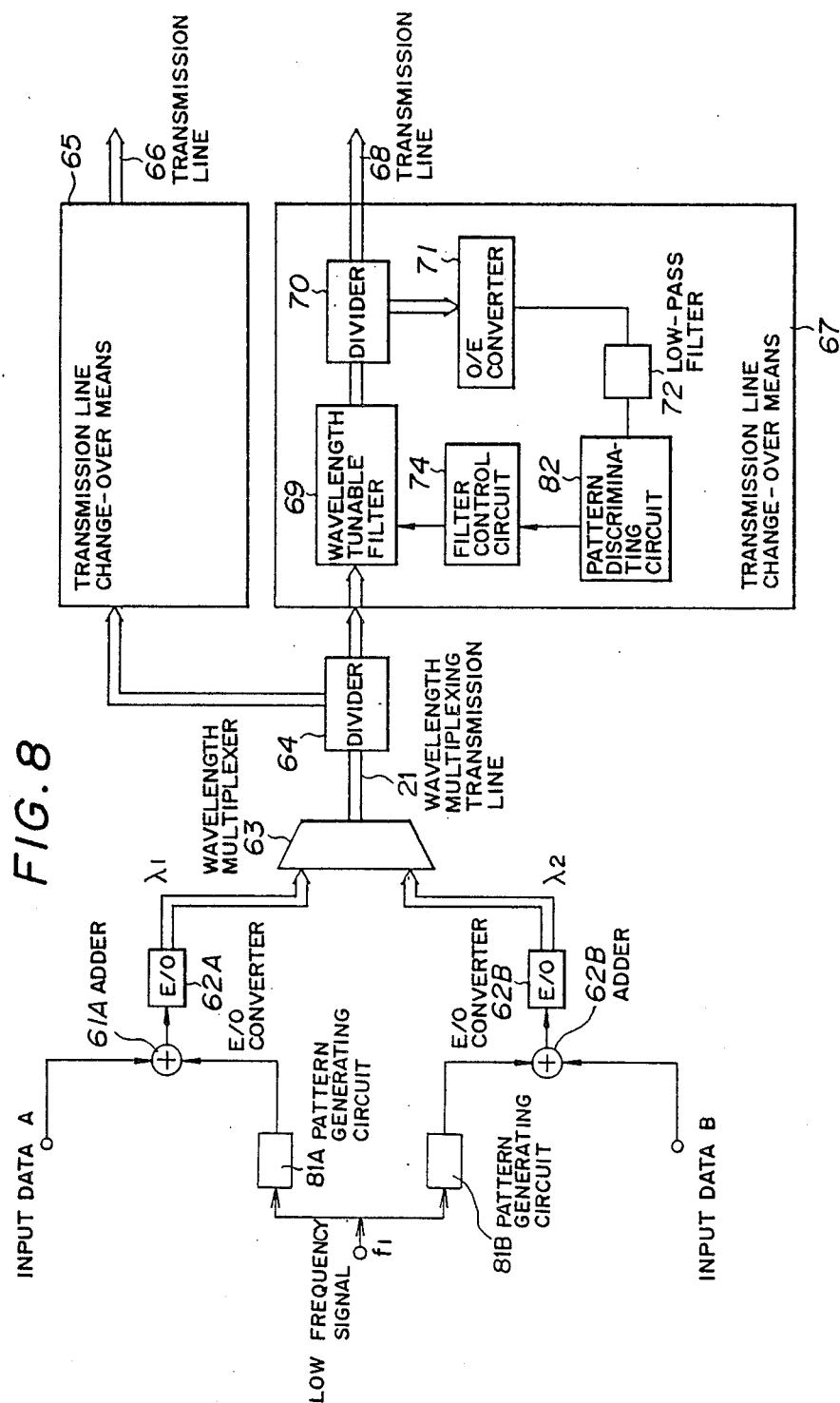
FIG. 8 is a block diagram showing a second embodiment of an apparatus for discriminating an optical signal from others according to the invention.
Figure 9:
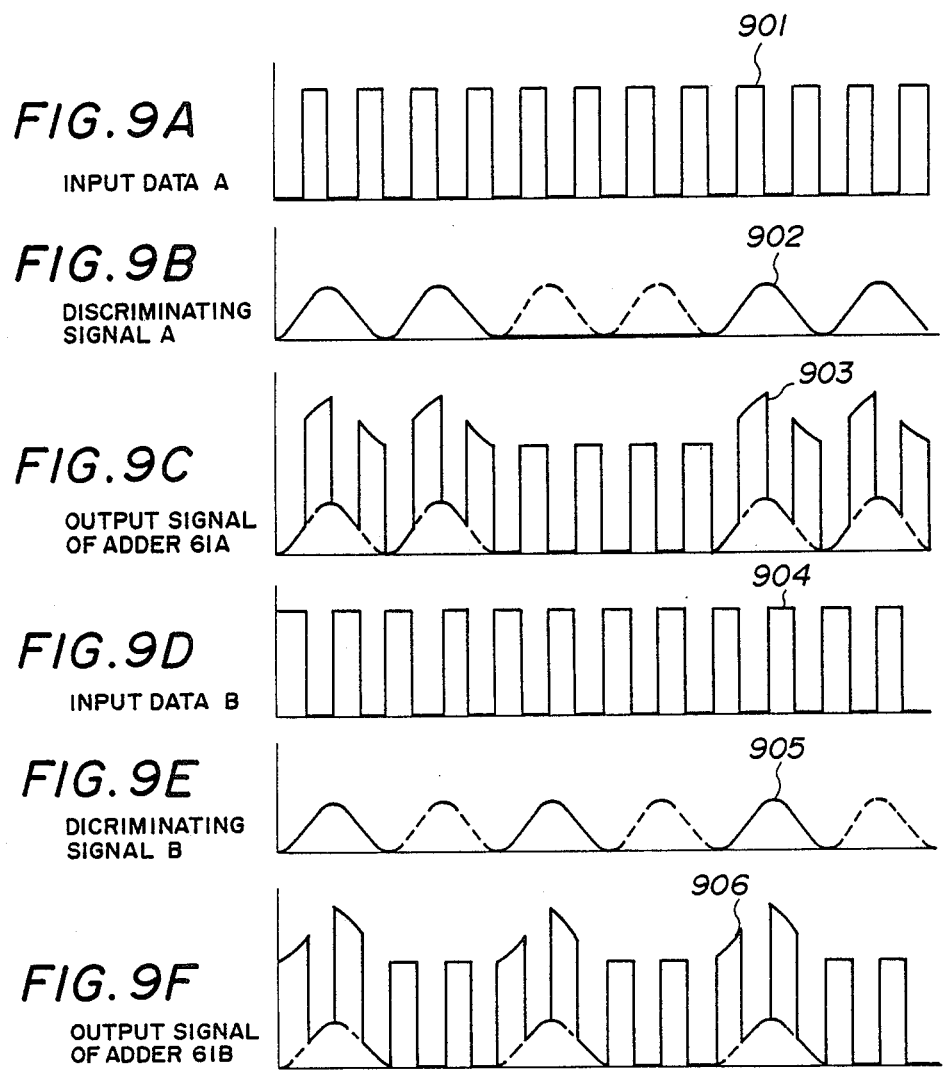
FIGS. 9A to 9F are wave forms of signals in the second embodiment of the apparatus shown in FIG. 8.

In FIG. 8, there is shown an apparatus for discriminating an optical signal from others in a second embodiment according to the invention. In the apparatus for discriminating an optical signal from others, a low-frequency signal of a frequency $f_1$ is supplied to pattern generating circuits 81A and 81B in which different pattern signals 902 and 905 (FIGS. 9B and 9E) are generated as discriminating signals A and B. Input data A and B (reference numerals 901 and 904 in FIGS. 9A and 9D) are added to the discriminating signals A and B in adders 61A and 61B respectively. Signals thus added (reference numerals 903 and 906 in FIGS. 9C and 9F) are converted into optical signals of wavelengths $\lambda_1$ and $\lambda_2$ in electric-optic converters 62A and 62B respectively. The optical signals of the wavelengths $\lambda_1$ and $\lambda_2$ are multiplexed in a wavelength multiplexer 63 to produce a wavelength division multiplexing signal which is propagated through a wavelength multiplexing transmission line 21 and then divided into two optical signals in a divider 64. The two optical signals are supplied to transmission line change-over means 65 and 67. In the transmission line change-over means 67, a sweep of a wavelength tunable filter 69 is performed from a short wavelength to a long wavelength and vice versa to select an optical signal of a predetermined wavelength from the wavelength division multiplexing signal. Here, it is assumed that an optical signal of a wavelength $\lambda_1$ is selected in the wavelength tunable filter 69. The optical signal of the wavelength $\lambda_1$ which is selected therein is divided in a divider 70 to be supplied in a major portion thereof to a transmission line 68 and in the remaining portion thereof to an optic-electric converter 71. The optical signal supplied to the optic electric converter 71 is converted therein into an electric signal which is then supplied to a low-pass filter 72. The discriminating signal A (902 in FIG. 9B) of the frequency $f_1$ is only passed through the low-pass filter 72 and then supplied to a pattern discriminating circuit 82. The pattern 902 of the discriminating signal A is detected in the pattern discriminating circuit 82 to be allocated to an optical signal of a wavelength $\lambda_1$. As a result, it is discriminated in a filter control circuit 74 that a wavelength of an optical signal which is now selected in the wavelength tunable filter 69 is $\lambda_1$. At this moment, a sweep of the wavelength tunable filter 69 is stopped to be continued by the filter control circuit 74 so that the optical signal of the wavelength $\lambda_1$ is supplied through the transmission line change-over means 67 to the transmission line 68. On the other hand, an optical signal of a wavelength $\lambda_2$ is supplied through the transmission line change-over means 67 to the transmission line 68 in a case where a sweep of the wavelength tunable filter 69 is stopped to be continued by the filter control circuit 74 when a pattern of a discriminating signal detected in the pattern discriminating circuit 82 coincides with the pattern 905 (FIG. 9E) for the optical signal of the wavelength $\lambda_2$. As apparent from the illustrations in FIGS. 9B and 9E, the discriminating signal A is of the pattern 902 in which sinusoidal waves of the low-frequency $f_1$ are appeared in each four periods by two periods, and the discriminating signal B is of the pattern 905 in which a sinusoidal wave of the low-frequency $f_1$ is appeared in each two periods by one period. However, a pattern other than these patterns may be adopted.

Figure 10:
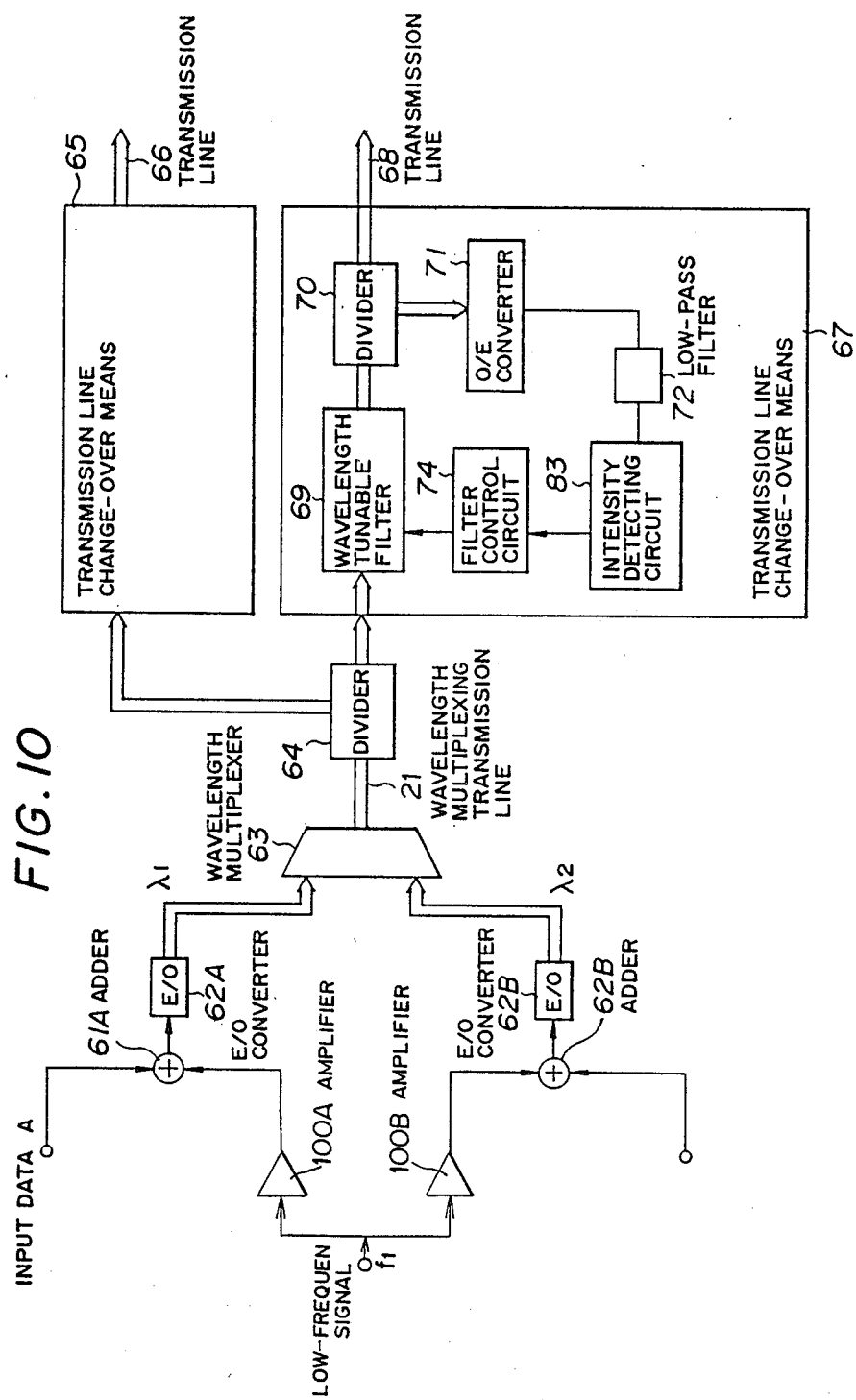
FIG. 10 is a block diagram showing a third embodiment of an apparatus for discriminating an optical signal from others according to the invention.
Figure 11:
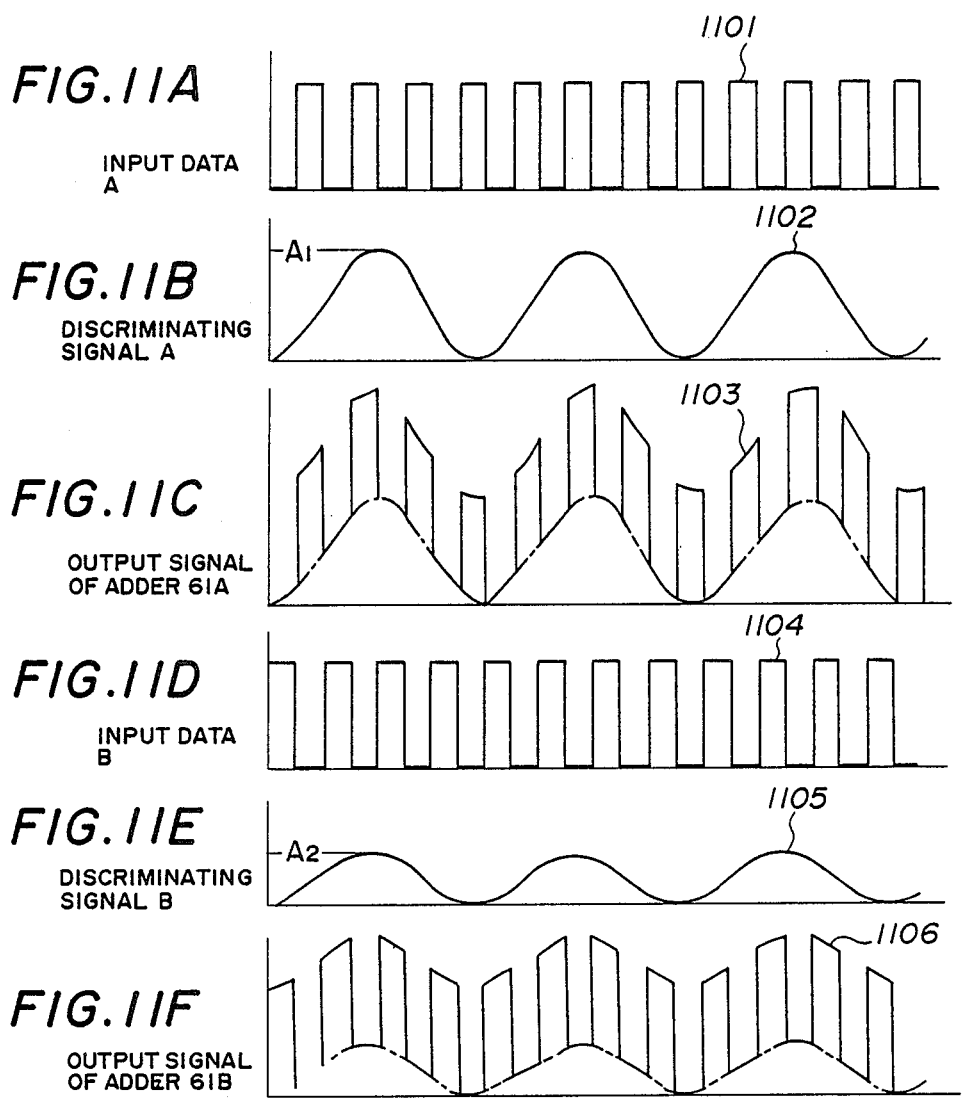
FIGS. 11A to 11F are waveforms of signals in the third embodiment of the apparatus shown in FIG. 10.

In FIG. 10, there is shown an apparatus for discriminating an optical signal from others in a third embodiment according to the invention. In the apparatus for discriminating an optical signal from others, a low-frequency signal of a frequency $f_1$ are supplied to amplifiers 100A and 100B having different amplifying degrees to produce discriminating signals A and B having different amplitudes $A_1$ and $A_2$ as shown by reference numerals 1102 and 1105 in FIGS. 11B and 11E. Input data A and B as shown by reference numerals 1101 and 1104 in FIGS. 11A and 11E are added in adders 61A and 61B to the discriminating signals A and B, respectively, to produce added signals 1103 and 1106 as shown in FIGS. 11C and 11F. The added signals are converted in electric-optic converters 62A and 62B into optical signals of wavelengths $\lambda_1$ and $\lambda_2$, respectively, which are then multiplexed in a wavelength multiplexer 63. An optical signal thus multiplexed is propagated through a wavelength multiplexing transmission line 21, and then divided in a divider 64 into two optical signals which are supplied to transmission line change-over means 65 and 67. In the transmission line change-over means 67, an optical signal of a predetermined wavelength is selected in a wavelength tunable filter 69 in accordance with a sweep thereof from a short wavelength to a long wavelength and vice versa. Here, it is assumed that an optical signal of a wavelength $\lambda_1$ is selected in the wavelength tunable filter 69 from a wavelength division multiplexing signal. The optical signal of the wavelength $\lambda_1$ thus selected is supplied through a divider 70 in a major portion thereof to a transmission line 68, and in the remaining portion thereof to an optic-electric converter 71. The optical signal supplied to the optic-electric converter 71 is converted therein into an electric signal to be supplied to a low-pass filter 72 through which the discriminating signal A of the low-frequency as shown in FIG. 11 B is passed. An amplitude of the discriminating signal A thus passed through the low-pass filter 72 is detected in an intensity detecting circuit 83 so that it is discriminated in a filter control circuit 74 in accordance with the amplitude $A_1$ that a wavelength of an optical signal which is now selected in the wavelength tunable filter 69 is $\lambda_1$. Therefore, a sweep of the wavelength tunable filter 69 is stopped by the filter control circuit 74 so that the optical signal of the wavelength $\lambda_1$ is supplied through the transmission line change-over means 67 to the transmission line 68.

On the other hand, a sweep of the wavelength tunable filter 69 is performed until an amplitude of a discriminating signal which is detected in the intensity detecting circuit 83 coincides with the amplitude $A_2$ of an optical signal of a wavelength $\lambda_2$ in a case where the optical signal of the wavelength $\lambda_2$ is supplied through the transmission line change-over means 67 to the transmission line 68.

As clearly understood from the above, a predetermined wavelength of an optical signal which is selected from a wavelength division multiplexing signal can be supplied through a corresponding transmission line change-over means to a corresponding transmission line only by using a low-frequency signal of a frequency $f_1$.

In the first to third embodiments, a sinusoidal wave may be replaced by a triangle wave, a trapezoidal wave and so on. Further, two or three of the embodiments may be combined wherein, for instance, a discriminating signal using a frequency and a pattern may be adopted. Still further, a discriminating signal may be of a low-frequency signal which is to be modulated in at least one of a frequency, a phase, a pulse position, a pulse width and so on.

Figure 12:
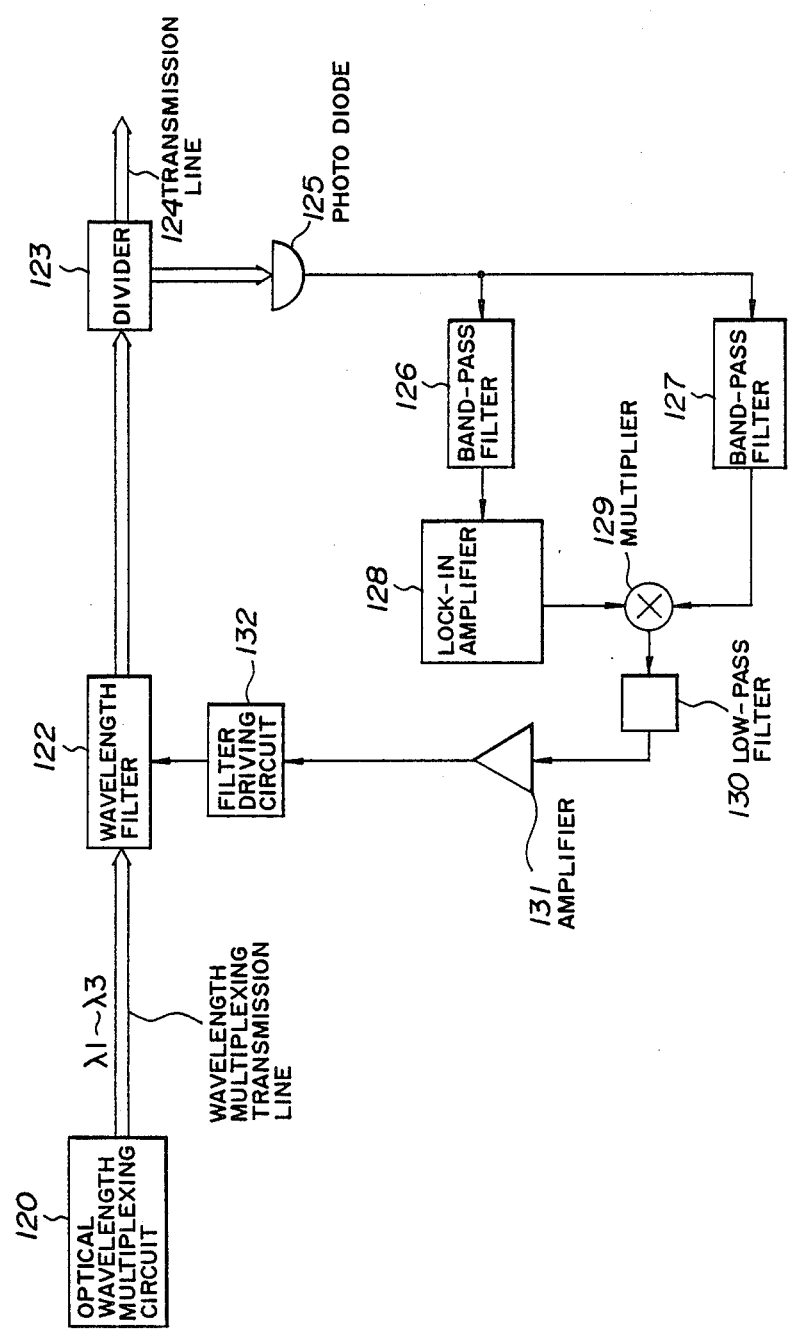
FIG. 12 is a block diagram showing a first embodiment of an apparatus for tuning an optical wavelength filter used in an apparatus for discriminating an optical signal from others according to the invention.
Figure 13:
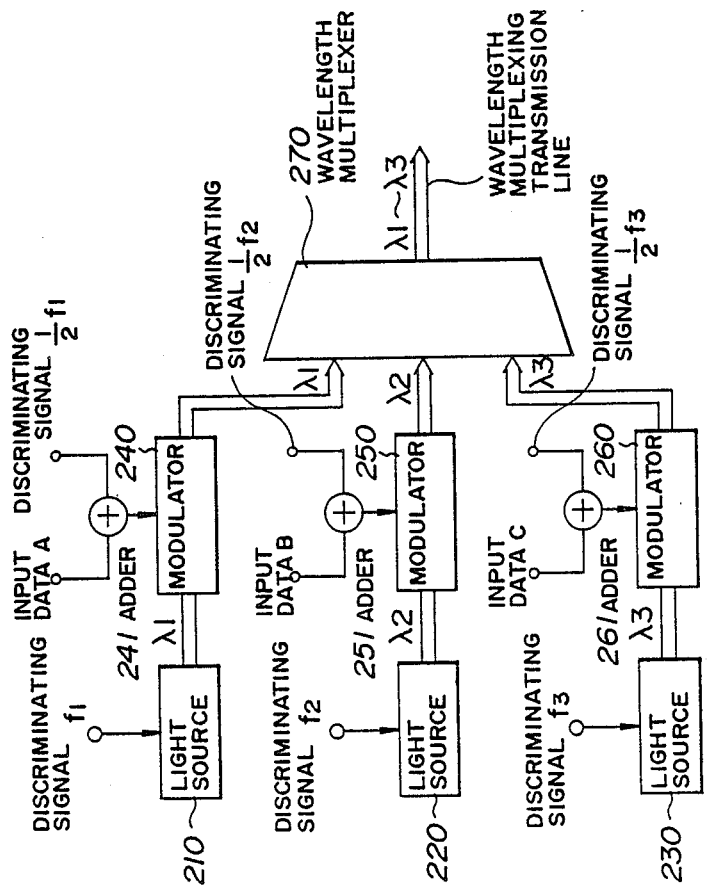
FIG. 13 is a block diagram showing an optical wavelength multiplexing circuit included in the apparatus shown in FIG. 12.

In FIGS. 12 and 13, there is shown an apparatus for tuning an optical filter used in an apparatus for discriminating an optical signal from others in a first embodiment according to the invention. In the apparatus for tuning an optical filter, optical signals of wavelengths $\lambda_1$, $\lambda_2$ and $\lambda_3$ which are frequency-modulated, respectively, by low-frequency discriminating signals $f_1$, $f_2$ and $f_3$ are supplied from the light sources 210, 220 and 230 to modulators 240, 250 and 260. On the other hand, input data A, B and C are added in adders 241, 251 and 261 with discriminating signals of frequencies $\frac{1}{2}f_1$, $\frac{1}{2}f_2$ and $\frac{1}{2}f_3$ respectively. In the modulators 240, 250 and 260, the optical signals of the wavelength $\lambda_1$, $\lambda_2$ and $\lambda_3$ are amplitude-modulated respectively, by added signals which are supplied from the adders 241, 251 and 261. Thereafter, the optical signals of the wavelengths $\lambda_1$, $\lambda_2$ and $\lambda_3$ are multiplexed in a wavelength multiplexer 270 to be supplied to a wavelength multiplexing transmission 121. These are performed in an optical wavelength multiplexing circuit 120 in which phases of the discriminating signals $f_1$ and $\frac{1}{2}f_1$, and those of $f_2$ and $\frac{1}{2}f_2$, and $f_3$ and $\frac{1}{2}f_3$ are controlled to be the same as each other respectively. Here, it is assumed that a wavelength filter is tuned to an optical signal of a wavelength $\lambda_2$ to be selected from an optical wavelength division multiplexing signal of wavelengths $\lambda_1$, $\lambda_2$ and $\lambda_3$. Current is continued to be injected into the wavelength filter 122 until an optical signal of a wavelength $\lambda_2$ is passed therethrough on a state that a center wavelength thereof is controlled to be near the wavelength $\lambda_2$. As a result, the optical signal of the wavelength $\lambda_2$ is supplied from the wavelength filter 122 to a divider 123 in which the optical signal is divided to be supplied in a major portion to a transmission line 124 and in the remaining portion to a photodiode 125. An electric signal is obtained in the photodiode 125 in accordance with the conversion of the optical signal of the wavelength $\lambda_2$, and supplied to band-pass filters 126 and 127. In the band-pass filter 126, only the discriminating signal of the frequency $\frac{1}{2}f_2$ is selected from the electric signal to be supplied to a lock-in amplifier 128, and in the band-pass filter 127, only the discriminating signal of the frequency $f_2$ is selected from the electric signal to be supplied to a multiplier 129. In the lock-in amplifier 128, an electric signal of a frequency $f_2$ and of the same phase as the discriminating signal of the frequency $\frac{1}{2}f_2$ is produced in accordance with the discriminating signal of the frequency $\frac{1}{2}f_2$ supplied from the band-pass filter 126, and then supplied to the multiplier 129. The discriminating signal of the frequency $f_2$ passed through the band-pass filter 127 is an electric signal 510 as shown in FIG. 5B which is out of phase in regard to the discriminating signal supplied to the light source 220 in a case where a center wavelength $\lambda_0$ of the wavelength filter 122 is positioned on a short wavelength side of the wavelength $\lambda_2$, and is an electric signal 530 as shown in FIG. 5D which is the same phase as the discriminating signal supplied to the light source 220 in a case where the center wavelength $\lambda_0$ is positioned on a long wavelength side of the wavelength $\lambda_2$. The outputs of lock-in amplifier 128 and the band-pass filter 127 are multiplied in the multiplier 129 to produce a multiplied signal which is then supplied to a low pass-filter 130. A negative direct current component of the multiplied signal is supplied from the low-pass filter 130 to an amplifier 131 in a case where the center wavelength $\lambda_0$ is on a short wavelength of the tuning wavelength $\lambda_2$, while a positive direct current of the multiplied signal is supplied from the low-pass filter 130 to the amplifier 131 in a case where the center wavelength $\lambda_0$ is on a long wavelength of the tuning wavelength $\lambda_2$. Therefore, the wavelength filter 122 is controlled by a filter driving circuit 132 to which the direct current component is supplied through the amplifier 131 from the low-pass filter 130 so that the center wavelength $\lambda_0$ is shifted in a direction of a long wavelength in accordance with a control of current injected thereinto when the direct current is negative, and the center wavelength $\lambda_0$ is shifted in a direction of a short wavelength in the same manner when the direct current is positive. Consequently, when the center wavelength $\lambda_0$ of the wavelength filter 122 is tuned to the wavelength $\lambda_2$, an output of the low-pass filter 129 becomes zero so that current injected thereinto is stopped to be increased or decreased by the filter driving circuit 132. As understood from the above, it is no longer necessary in the embodiment that a discriminating signal is transmitted from an optical wavelength multiplexing circuit to a multiplexer as required in a conventional apparatus.

Figure 14:
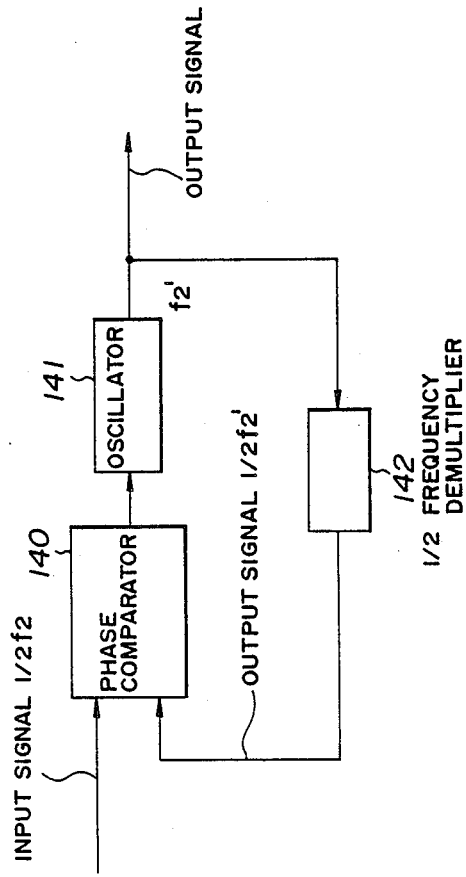
FIG. 14 is a block diagram showing a lock-in amplifier included in the apparatus shown in FIG. 12.

In FIG. 14, there is shown an embodiment of the lock-in amplifier 128 as shown in FIG. 12. In the lock-in amplifier 128, a signal of a frequency $f_2'$ is produced in an oscillator 141 to be supplied to a $\frac{1}{2}$ frequency demultiplier 142 from which a signal of a frequency $\frac{1}{2}f_2'$ is supplied to a phase comparator 140. A signal of a frequency $\frac{1}{2}f_2'$ is supplied from the band-pass filter 126 to the phase comparator 140 in which the signals of the frequencies $\frac{1}{2}f_2'$ and $\frac{1}{2}f_2$ are compared in regard to a phase difference to produce a signal which is proportional to the phase difference so that an oscillation frequency of the oscillator 141 is controlled by the phase difference signal. As a result, a signal of the same phase as the signal of the frequency $\frac{1}{2}f_2$ and of the frequency $f_2$ is obtained in the oscillator 141 because a feedback control is performed wherein phases of two inputs of the phase comparator 140 are coincided with each other. In the embodiment, discriminating signals of frequencies of $\frac{1}{2}f_1$, $\frac{1}{2}f_2$ and $\frac{1}{2}f_3$ may be replaced by discriminating signals of frequencies $(1/n)f_1$, $(1/n)f_2$ and $(1/n)f_3$, where n is an integer.

Figure 15:
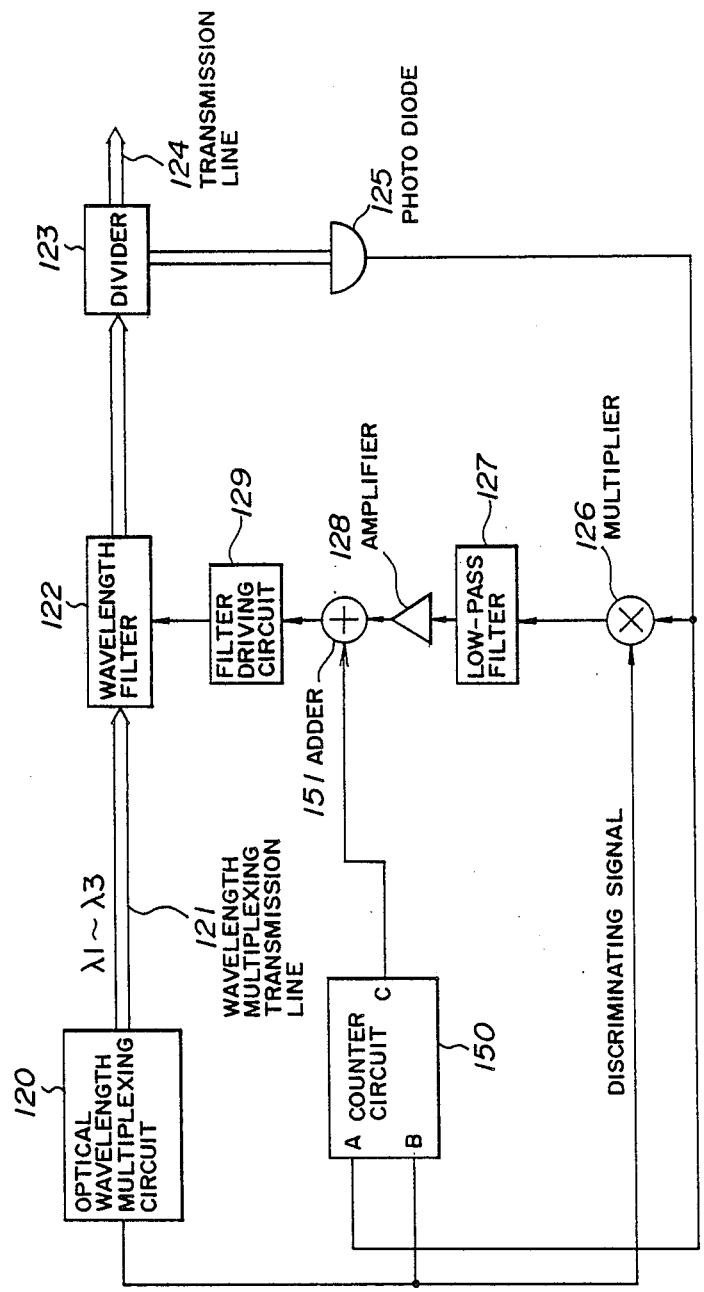
FIG. 15 is a block diagram showing a second embodiment of an apparatus for tuning an optical wavelength filter used in an apparatus for discriminating an optical signal from others according to the invention.

In FIG. 15, there is shown an apparatus for tuning an optical wavelength filter in a second embodiment according to the invention. In the apparatus for tuning an optical filter, a wavelength division multiplexing signal produced in an optical wavelength multiplexing circuit 120 such as a circuit shown in FIG. 3 in which optical signals of wavelengths $\lambda_1$, $\lambda_2$ and $\lambda_3$ are frequency-modulated by low-frequency signals $f_1$, $f_2$ and $f_3$ is propagated through a wavelength multiplexing transmission line 121, and then supplied to a wavelength filter 122. When the wavelength filter 122 is begun to select a wavelength which is different from a predetermined wavelength, a minor portion of an optical signal supplied from the wavelength filter 122 is supplied through a divider 123 to a photodiode 125. Therefore, an electric signal is supplied to an input terminal A of a counter circuit 150 and a multiplier 126, while a discriminating signal for an optical signal of a tuning wavelength is supplied from the optical wavelength multiplexing circuit 120 to an input terminal B of the counter circuit 150. In the counter circuit 150, frequencies of the signals supplied to the input terminals A and B are counted, respectively, to produce a signal which is dependent on a difference between counted frequencies at an output terminal C. The output signal of the counter circuit 150 is supplied through an adder 151 to a filter driving circuit 129 so that a sweep of the wavelength filter 122 is performed to shift a center wavelength in a direction of a short wavelength or a long wavelength in accordance with a signal supplied to the filter driving circuit 129 thereby increasing or decreasing current injected into the wavelength filter 122.

In a case where no optical signal of a wavelength selected from a wavelength division multiplexing signal of the wavelengths $\lambda_1$, $\lambda_2$ and $\lambda_3$ is passed through the wavelength filter 122 so that no electric signal of the frequencies $f_1$, $f_2$ and $f_3$ is supplied from the photodiode 125 to the input terminal A of the counter circuit 150, the counting of frequencies is stopped at the input terminal B of the counter circuit 150, and a control signal which has been produced at the output terminal C thereof so far is continued to be supplied through the adder 151 to the filter driving circuit 129.

In a case where the wavelength filter 122 is begun to tune to a predetermined wavelength among the wavelengths $\lambda_1$, $\lambda_2$ and $\lambda_3$ of a wavelength division multiplexing signal so that a frequency of a signal which is supplied from the photodiode 125 to the input terminal A of the counter circuit 150 is equal to that of a discriminating signal supplied from the optical wavelength multiplexing circuit 120 to the input terminal B of the counter circuit 150, no output is produced at the output terminal C thereof so that a sweep of the center wavelength $\lambda_0$ is stopped to be continued in the wavelength filter 122. Otherwise, an amplifier 126, a low-pass filer 127 and an amplifier 128 operate in the same manner as in the first embodiment so that the center wavelength $\lambda_0$ of the wavelength filter 122 is tuned to a predetermined wavelength.

Figure 16:
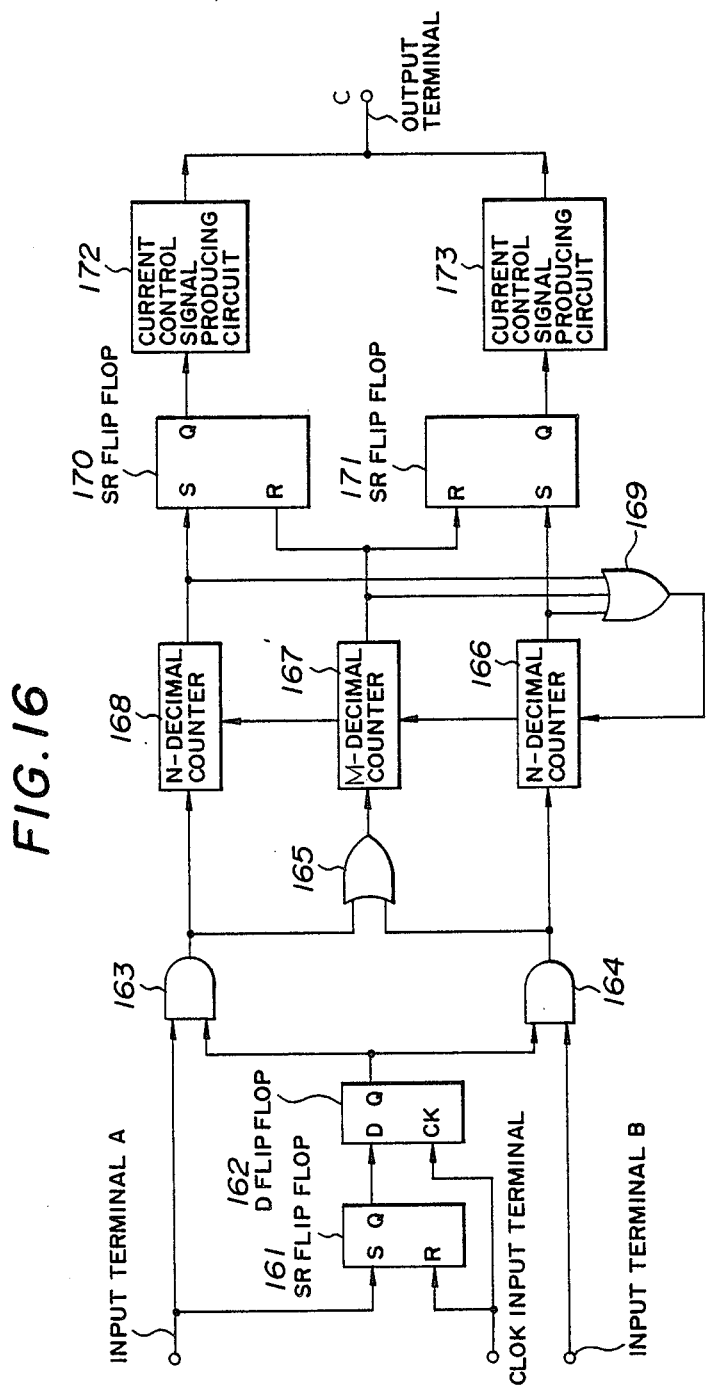
FIG. 16 is a block, diagram showing a counter circuit included in the apparatus shown in FIG. 15, FIGS. 17A to 17D are explanatory diagrams showing operation of the apparatus shown in FIG. 15.
Figure 17A:
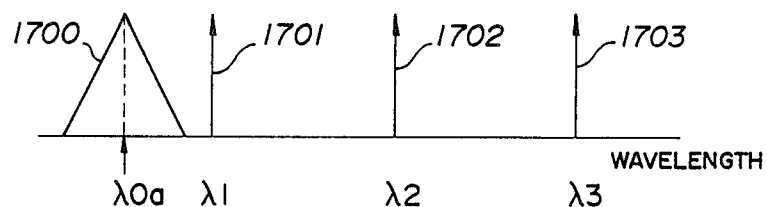
Figure 17B:
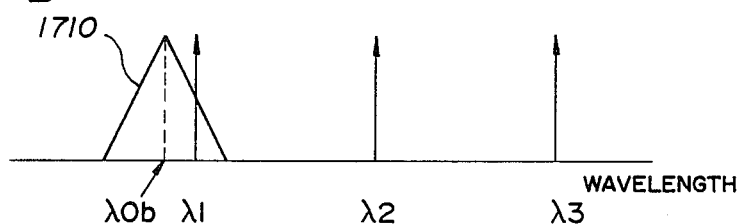
Figure 17C:
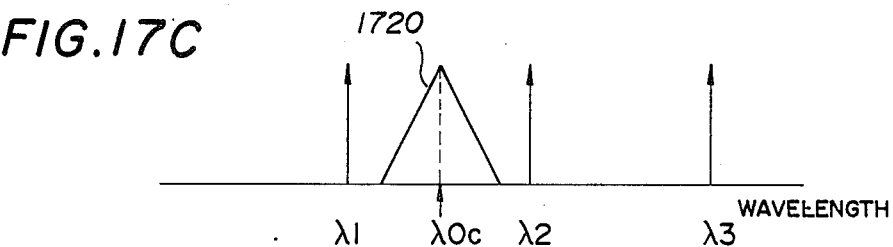
Figure 17D:
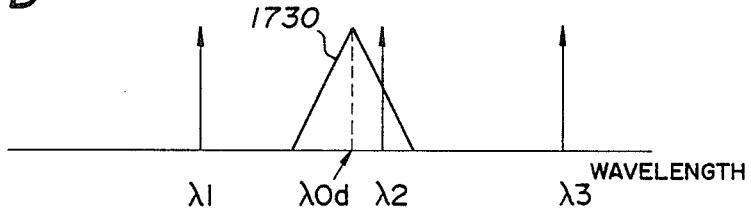

In FIG. 16, there is shown an embodiment of the counter circuit 150 included in the apparatus as shown in FIG. 5. Here, it is assumed that a center wavelength of the wavelength filter 122 is tuned to the wavelength $\lambda_2$. Spectrums 1701, 1702 and 1703 of the wavelengths $\lambda_1$, $\lambda_2$ and $\lambda_3$ ($\lambda_1 < \lambda_2 < \lambda_3$) which are frequency discriminating signals $f_1$, $f_2$ and $f_3$ ($f_1 < f_2 < f_3$) are shown in FIG.

17A. At first, a center wavelength of the wavelength filter 122 is on a wavelength $\lambda_{0a}$ as shown by a transmission curve 1700 so that a sweep of the wavelength filter 122 is performed in a direction from the wavelength $\lambda_{0a}$ to a longer wavelength, and when a center wavelength thereof is shifted on a wavelength $\lambda_{0b}$ as shown by a transmission curve 1710 in FIG. 17B, the wavelength filter 122 is begun to pass an optical signal of the wavelength $\lambda_1$. Therefore, an electric signal of the frequency $f_1$ is supplied to the input terminal A of the counter circuit. On the other hand, a discriminating signal of the frequency $f_2$ is supplied from the optical wavelength multiplexing circuit to the input terminal B thereof. Simultaneously, clock signal of a frequency lower than a frequency of an electric signal to be supplied to the input terminal A is applied to terminals R and CK of a SR flip-flop 161 and a D flip-flop 162. When an electric signal of the frequency $f_1$ is supplied to the input terminal A, the electric signal supplied to a terminal S of the SR flip-flop 161 is detected therein at a rising time of the clock signal to produce a high-level output, which is supplied to a terminal D of the flip-flop 162, at a terminal Q of the SR flip-flop 161. When the high-level signal is supplied to the terminal D of the D flip-flop 162, the high-level signal is held therein to produce a high-level signal which is then supplied to AND circuit 163 and 164.

As explained above, a high-level signal is supplied from the D flip-flop 162 to AND circuits 163 and 164 when an electric signal of the frequency $f_1$ is supplied to the input terminal A so that a frequency of the electric signal of the frequency $f_1$ is counted in an N-decimal counter 168, and a frequency of an electric signal of the frequency $f_2$ supplied to the input terminal B is counted in an N-decimal counter 166. While, the electric signals of the frequencies $f_1$ and $f_2$ are supplied through an OR circuit 165 to an M-decimal counter 167 in which an adding value of the frequencies $f_1$ and $f_2$ is counted. Among the N-decimal counters 166 and 168 and the M-decimal counter 167, a counted value of the N-decimal counter 166 becomes "N" at the earliest time so that an output pulse is supplied to one of input terminals of an OR circuit 169 and a terminal S of a SR flip-flop 171. Consequently, a high-level signal is supplied from an output terminal Q of the SR flip-flop 171 to a current control signal producing circuit 173, while a counter resetting signal is supplied from the OR circuit 169 to the N-decimal counter 166 and 168 and the M-decimal counter 167 so that these counters are reset. In the current control signal producing circuit 173, a control signal which is supplied through an output terminal C to the adder 151 (FIG. 15) is produced in accordance with the high-level signal supplied from the SR flip-flop 171 so that a center wavelength of the wavelength filter 122 is shifted in a direction of a long wavelength. As a result, a center wavelength of the wavelength filter 122 is shifted to be on a wavelength $\lambda_{0C}$ as shown by a transmission curve 1720 in FIG. 17C so that none of the wavelengths $\lambda_1$, $\lambda_2$ and $\lambda_3$ is selected in the wavelength filter 122. Consequently, no electric signal is received at the input terminal A of the counter circuit, but an electric signal of the frequency $f_2$ is received at the input terminal B thereof so that a low-level signal is supplied from the D flip-flop 162 to the AND circuits 163 and 164 because a low-level signal is supplied from the SR flip-flop 161 thereto. Therefore, no signal is applied to the N-decimal counters 166 and 168 and the M-decimal counter 167 so that the high-level signal which is held in the SR flip-flop 171 is continued to be supplied to the current control signal producing circuit 173. Accordingly, a control signal by which a center wavelength of the wavelength filter 122 is shifted in a direction of a long wavelength is continued to be supplied therefrom through the output terminal to the adder 151 so that a center wavelength of the wavelength filter 122 is shifted to be on a wavelength $\lambda_{0d}$ which is very near the tuning wavelength $\lambda_2$ as shown by a transmission curve 1730 in FIG. 17D whereby an optical signal of the wavelength $\lambda_2$ is begun to be selected in the wavelength filter 122. This results in supplying an electric signal of a frequency which is the same as a discriminating signal of the frequency $f_2$ to the input terminal A of the counter circuit so that a high-level signal is supplied from the D flip-flop 162 to the AND circuits 163 and 164. Accordingly, the N-decimal counter 168 counts a frequency of the electric signal of the frequency $f_2$ supplied to the input terminal A, while the N-decimal counter 166 counts a frequency of the electric signal of the frequency $f_2$ supplied to the input terminal B. Further, the M-decimal counter 167 counts an adding frequency value of the both signals supplied to the input terminals A and B. In the circumstance, a counted value of the M-decimal counter 167 becomes "M" before those of the N-decimal counters 166 and 168 become "N" so that an output pulse is supplied from the M-decimal counter 167 to reset terminals Rs of the SR flip-flop 170 and 171 and to one of the terminals of the OR circuit 169. Accordingly, low-level signals are supplied from terminals Qs of the SR flip-flops 170 and 171 to the current control signal producing circuits 172 and 173 so that no control signal is supplied therefrom whereby a sweep of the wavelength filter 122 is stopped to be continued. Simultaneously, the N-decimal counters 166 and 168 and the M-decimal counter 167 are reset in accordance with a resetting signal supplied from the OR circuit 169. In addition, the photodiode 125, the multiplier 126, the low-pass filter 127, the amplifier 128, the adder 151, and the filter driving circuit 129 operate in the same manner as in the first embodiment so that the center wavelength $\lambda_0$ of the wavelength filter 122 is tuned to a predetermined wavelength.

Next, it will be explained that a center wavelength of the wavelength filter 122 which is on a wavelength larger than the wavelength $\lambda_3$ is shifted to be tuned to the wavelength $\lambda_2$. For this purpose, a sweep of the wavelength filter 122 is performed in a direction of short wavelength at the beginning of operation so that an optical signal of the wavelength $\lambda_3$ is begun to be transmitted through the wavelength filter 122. As a result, an electric signal of the frequency $\lambda_3$ is supplied to the input terminal A of the counter circuit. While, a discriminating signal of the frequency $f_2$ is supplied from the optical wavelength multiplexing circuit 120 (FIG. 15) to the input terminal B of the counter circuit. In the circumstance, a high-level signal is supplied from the D flip-flop 162 to the AND circuits 163 and 164 so that the N-decimal counter 168 counts a frequency of the electric signal of the frequency $f_3$ supplied to the input terminal A, while the N-decimal counter 166 counts a frequency of the discriminating signal of the frequency $f_2$. Further, the M-decimal counter 167 counts an adding value of the frequencies $f_1$ and $f_2$ of the signals supplied to the input terminals A and B. As a result, a counted value of the N-decimal counter 168 becomes "N" before counted values of the N-decimal counter 166 and the M-decimal counter 167 become "N" and "M" respectively because the frequency $f_3$ is larger than the frequency $f_2$ so that an output pulse is supplied from the N-decimal counter 168 to the terminal S of the SR flip-flop 170 and to one of the terminals of the OR circuit 169. Accordingly, a high-level signal is supplied from the terminal Q of the SR flip-flop 170 to the current control signal producing circuit 172 to produce a current control signal therefrom and a resetting signal is supplied to the N-decimal counters 166 and 168 and the M-decimal counter 167 which are thereby reset. A control signal by which a center wavelength of the wavelength filter 122 is shifted in a direction of a short wavelength is supplied from the current control signal producing circuit 172, to which a high-level signal is supplied from the SR flip-flop 170, through the output terminal C to the adder 151 so that a center wavelength of the wavelength filter 122 is shifted to be on a wavelength between the wavelengths $\lambda_2$ and $\lambda_3$. As a result, no optical signal of the wavelengths $\lambda_1$, $\lambda_2$ and $\lambda_3$ is passed through the wavelength filter 122 so that no electric signal is applied to the input terminal A of the counter circuit thereby producing a low-level signal at the terminal Q of the SR flip-flop 161, and then producing a low-level signal at the terminal Q of the D flip-flop 162. Consequently, no signal is passed through the AND circuits 163 and 164 to be supplied to the N-decimal counters 166 and 168 and the M-decimal counter 167 so that a high-level signal which is held in the SR flip-flop 170 is continued to be supplied to the current control signal 172. Accordingly, a control signal by which a center wavelength of the wavelength filter 122 is shifted in a direction of a short wavelength is continued to be supplied through the output terminal C to the adder 151. Under the situation, a center wavelength of the wavelength filter 122 is gradually approaching the wavelength $\lambda_2$, and a sweep of the wavelength filter 122 is stopped to be continued when an optical signal of the wavelength $\lambda_2$ is begun to be passed through the wavelength filter 122 on a state that a center wavelength of the wavelength filter 122 is on a wavelength which is near the tuning wavelength $\lambda_2$. In addition, the photodiode 125, the multiplier 126, the low-pass filter 127, the amplifier 128, and the filter driving circuit 129 operate in the same manner as in the first embodiment so that a center wavelength of the wavelength filter 122 is tuned to the tuning wavelength $\lambda_2$.

As understood from the above, a center wavelength of a wavelength filter is tuned to a predetermined tuning wavelength without the necessity that the center wavelength is beforehand controlled to be near the tuning wavelength even if the center wavelength is different beyond a predetermined wavelength width from the tuning wavelength for the reason why the counter circuit 150 is provided in the apparatus as shown in FIGS. 15 and 16.

Figure 18:
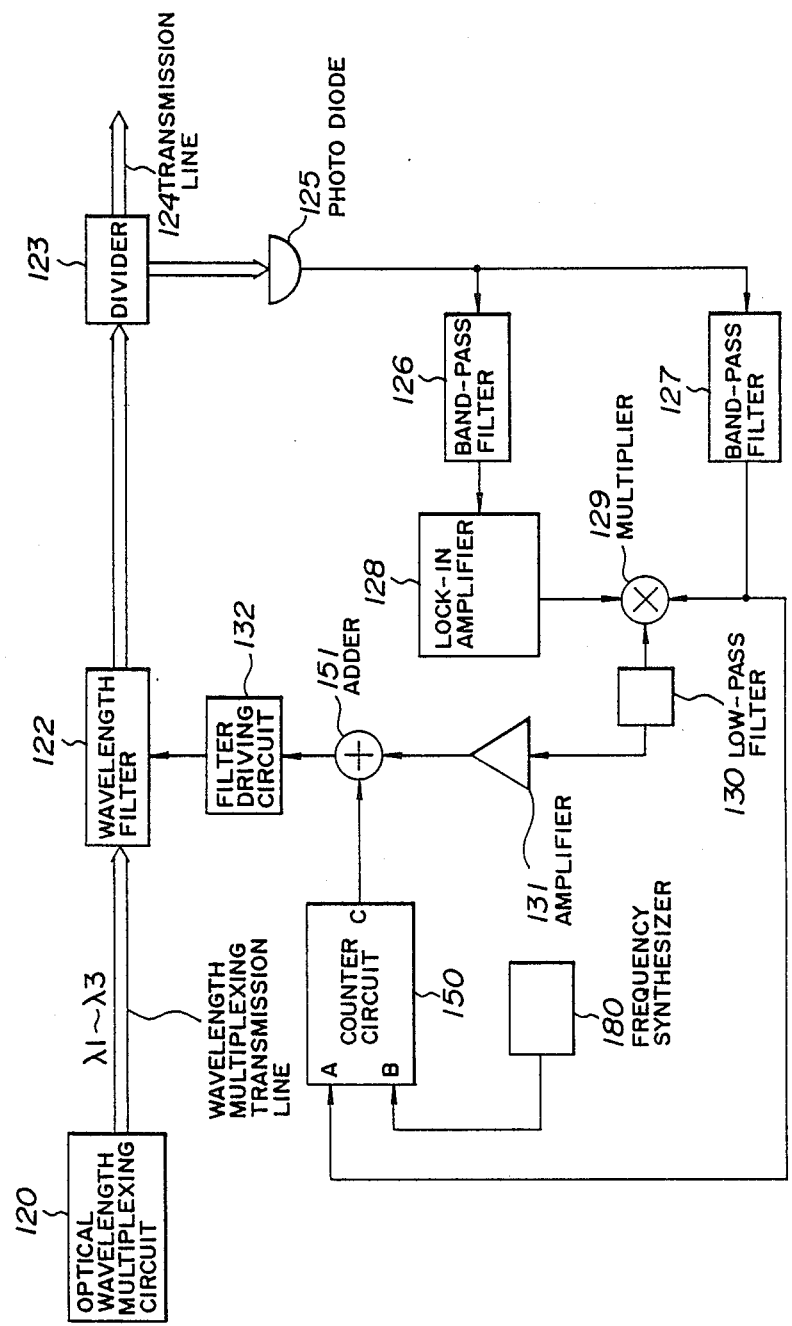
FIG. 18 is a block diagram showing a third embodiment of an apparatus for tuning an optical wavelength filter used in an apparatus for discriminating an optical signal from others according to the invention.

In FIG. 18, there is shown an apparatus for tuning an optical wavelength filter in a third embodiment according to the invention. In the apparatus for tuning an optical wavelength filter, a counter circuit 150 as explained in FIGS. 15 and 16 is further added to the apparatus as explained in the first embodiment, and an optical wavelength multiplexing circuit 120 and a band-pass filter 127 are the same as those shown in FIG. 12. As explained in the first embodiment, an electric signal of the same frequency as a frequency of a discriminating signal by which an optical signal to be selected in a wavelength filter 122 is frequency-modulated is passed through a band-pass filter 127 to be supplied to an input terminal A of the counter circuit 150 in which frequencies of the electric signal and of an electric signal, of the same frequency as the discriminating signal, supplied from a frequency synthesizer 180 are counted. In a case where a frequency of the electric signal supplied to the input terminal A of the counter circuit 150 is lower than that of the electric signal supplied to the input terminal B thereof, a control signal by which a center wavelength of the wavelength filter 122 is shifted in a direction of a long wavelength is supplied from an output terminal C of the counter circuit 150 to an adder 151. While, in a case where the former is higher than the latter, a control signal by which the center wavelength is shifted in a direction of a short wavelength is supplied from the output terminal C to the adder 151. On the other hand, when no electric signal is supplied to the input terminal A of the counter circuit 150, a control signal which has been supplied from the output terminal C thereof so far is continued to be supplied to the adder 151. Finally, when electric signals of the same frequency are supplied to the input terminals A and B of the counter circuit 150, no control signal is produced therein so that a sweep of the wavelength filter 122 is stopped to be continued. A band-pass filter 126 and a lock-in amplifier 128 are the same as those shown in FIG. 12 wherein an electric signal of the same frequency as a discriminating signal by which an optical signal is amplitude-modulated in the optical wavelength multiplexing circuit 120 is passed through the band-pass filter 126 to be supplied to the lock-in amplifier 128 in which an electric signal of the same phase as an electric signal supplied from a photodiode 125 and of a frequency twice that of the electric signal is produced to be supplied to the multiplier 129. The electric signal thus supplied to the multiplier 129 is multiplied therein by the output signal from the band-pass filter 127 to produce a multiplied output signal which is supplied to an low-pass filter 132 to produce a direct current component therefrom. The direct current component is supplied through an amplifier 131 and the adder 151 to a filter driving circuit 132 as explained before.

As explained above, a center wavelength of a wavelength filter is tuned to a predetermined wavelength without the necessities that a discriminating signal is transmitted from an optical wavelength multiplexing circuit to a multiplier and that the center wavelength is beforehand controlled to be near a tuning wavelength even if the center wavelength is different beyond a predetermined wavelength width from the tuning wavelength.

In the third embodiment, an electric signal supplied from the band-pass filter 127 to the input terminal A of the counter circuit 150 may be replaced by an electric signal supplied from the band-pass filter 126 or the lock-in amplifier 128.

Although the invention has been described with respect to specific embodiment for complete and clear disclosure, the appended claims are not to thus limited but are to be construed as embodying all modification and alternative constructions that may occur to one skilled in the art which fairly fall within the basic teaching herein set forth.

What is claimed is:

1. An apparatus for discriminating an optical signal from others comprising,
    a plurality of adding means, each including an adder in which input data and a discriminating signal of a frequency lower than a signal band of said input data are added to produce an added signal, a plurality of electric-optic converters, each converting one of said added signals into an optical signal of a predetermined wavelength different from others, a wavelength multiplexer for multiplexing optical signals supplied from said plurality of electric-optic converters to produce an optical wavelengh division multiplexing signal which is propagated through a wavelength multiplexing transmission line, a divider for dividing said optical wavelength division multiplexing signal into a plurality of optical wavelength division multiplexing signals, and a plurality of transmission line change-over means, each supplying an optical signal of a predetermined wavelength to a corresponding transmission line and including a wavelength filter coupled to said divider for passing a optical signal of a wavelength selected from plural wavelengths therethrough, a circuit for detecting a discriminating signal included in said optical signal passed through said wavelength filter, and a circuit for controlling said wavelength filter in accordance with said discriminating signal detected in said circuit for detecting whereby a center wavelength of said wavelength filter is tuned to a predetermined tuning wavelength.

2. An apparatus for discriminating an optical signal from others according to claim 1, wherein each of said plurality of adding means includes a circuit for producing said discriminating signal of a predetermined frequency which is different from others, and said circuit for detecting includes a circuit for detecting said predetermined frequency of said discriminating signal.

3. An apparatus for discriminating an optical signal from others according to claim 1, wherein each of said plurality of adding means includes a circuit for producing said discriminating signal of a predetermined pattern which is different from others, and said circuit for detecting includes a circuit for detecting said predetermined pattern of said discriminating signal.

4. An apparatus for discriminating an optical signal from others according to claim 1, wherein each of said adding means includes an amplifier for amplifying a signal of the same amplitude as others to produce said discriminating signal of a predetermined amplitude which is different from others, and said circuit for detecting includes a circuit for detecting said predetermined amplitude of said discriminating signal.

5. An apparatus for tuning an optical wavelength filter used in an apparatus for discriminating an optical signal from others comprising, a circuit for producing an optical wavelength division multiplexing signal which includes a plurality of optical signals each having a different wavelength from others, each of said optical signals being frequency-modulated by a first discriminating signal and being amplitude-modulated by a second discriminating signal having a phase information of said first discriminating signal, an optical wavelength tunable filter responsive to said optical wavelength division multiplexing signal for passing an optical signal of a predetermined wavelength therethrough, means for converting said optical signal passed through said optical wavelength tunable filter into an electric signal, first and second filters for passing first and second signals of the same frequencies as said first and second discriminating signals, a circuit for producing a third signal of the same frequency as said first discriminating signal in accordance with said second signal, a circuit for producing a direct current component in accordance with a multiplication of said first and third signals, and a circuit for controlling said wavelength tunable filter to be tuned to an optical signal of a predetermined wavelength by sweeping a center wavelength thereof in accordance with said direct current component.

6. An apparatus for tuning an optical wavelength filter used in an apparatus for discriminating an optical signal from others comprising, a circuit for producing an optical wavelength division multiplexing signal which includes a plurality of optical signals each having a different wavelength from others, each of said optical signals being frequency-modulated by a discriminating signal, an optical wavelength tunable filter responsive to said optical wavelength division multiplexing signal for passing an optical signal of a predetermined wavelength therethrough, means for converting said optical signal passed through said optical wavelength tunable filter into an electric signal, a circuit for producing a direct current component in accordance with a multiplication of said electric signals and a predetermined one of said discriminating signal, a circuit for producing a control signal in accordance with a frequency difference between said electric signals and said predetermined one of said discriminating signal, and a circuit for controlling said wavelength tunable filter to be tuned to an optical signal of a predetermined wavelength by sweeping a center wavelength thereof in accordance with said direct current component and said control signal.

* * * * *

UNITED STATES PATENT AND TRADEMARK OFFICE
CERTIFICATE OF CORRECTION

PATENT NO. : 4,841,519

DATED : June 20, 1989

INVENTOR(S) : MAKOTO NISHIO

It is certified that error appears in the above-identified patent and that said Letters Patent is hereby corrected as shown below:

Col. 14, line 57, delete "filer" and insert --filter--.

Signed and Sealed this

Nineteenth Day of December, 1989

Attest:

JEFFREY M. SAMUELS

Attesting Officer     Acting Commissioner of Patents and Trademarks